*(12)* United States Patent
Vogelsang

(10) Patent No.: US 10,264,195 B1
(45) Date of Patent: Apr. 16, 2019

(54) SHARED-COUNTER IMAGE SENSOR

(71) Applicant: Rambus Inc., Sunnyvale, CA (US)

(72) Inventor: Thomas Vogelsang, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 15/805,024

(22) Filed: Nov. 6, 2017

Related U.S. Application Data

(63) Continuation of application No. 14/686,697, filed on Apr. 14, 2015, now Pat. No. 9,826,176, which is a continuation of application No. 13/864,427, filed on Apr. 17, 2013, now Pat. No. 9,036,065.

(60) Provisional application No. 61/684,117, filed on Aug. 16, 2012, provisional application No. 61/700,119, filed on Sep. 12, 2012.

(51) Int. Cl.
*H04N 5/353* (2011.01)
*H04N 5/355* (2011.01)
*H04N 5/378* (2011.01)
*H04N 5/3745* (2011.01)

(52) U.S. Cl.
CPC .......... *H04N 5/3535* (2013.01); *H04N 5/355* (2013.01); *H04N 5/35536* (2013.01); *H04N 5/378* (2013.01); *H04N 5/3745* (2013.01)

(58) Field of Classification Search
CPC ...... H04N 5/378; H04N 5/3355; H04N 5/374; H04N 5/355; H04N 5/35536
See application file for complete search history.

(56) References Cited

U.S. PATENT DOCUMENTS

| | | | | |
|---|---|---|---|---|
| 5,151,588 | A | * | 9/1992 | Kiri .................. G01N 23/04 250/208.1 |
| 5,665,959 | A | * | 9/1997 | Fossum .................. H04N 5/379 250/208.1 |
| 6,069,377 | A | | 5/2000 | Prentice et al. |
| 6,355,923 | B2 | * | 3/2002 | Pyyhtia .................. G01T 1/247 250/208.1 |
| 7,115,963 | B2 | * | 10/2006 | Augusto .................. H04N 5/374 257/440 |

(Continued)

FOREIGN PATENT DOCUMENTS

| WO | WO-2013-070932 A1 | 5/2013 |
|---|---|---|
| WO | WO-2013-070942 A1 | 5/2013 |

OTHER PUBLICATIONS

Fossum, Eric R., "What to Do With Sub-Diffraction-Limit (SDL) Pixels?—A Proposal for a Gigapixel Digital Film Sensor (DFS)," 2004, Discussion Session, pp. 214-217. 4 pages.

(Continued)

*Primary Examiner* — John Villecco
(74) *Attorney, Agent, or Firm* — Charles Shemwell

(57) ABSTRACT

An image sensor generates first digital samples and second digital samples during respective first and second sampling intervals, the first digital samples including at least one digital sample of each pixel of a first plurality of pixels, and the second digital samples including at least one digital sample of each pixel of a second plurality of pixels. A sum of the first digital samples is accumulated within a first counter as the first sampling interval transpires, and a sum of the second digital samples is accumulated within the first counter as the second sampling interval transpires.

20 Claims, 13 Drawing Sheets

(56) References Cited

U.S. PATENT DOCUMENTS

| | | | |
|---|---|---|---|
| 7,361,881 B2 * | 4/2008 | Spartiotis | G01T 1/2928 250/214 L |
| 8,253,090 B2 | 8/2012 | Barbier et al. | |
| 8,319,855 B2 | 11/2012 | Yang et al. | |
| 8,420,996 B2 | 4/2013 | Rissa et al. | |
| 8,488,034 B2 | 7/2013 | Nishihara | |
| 8,493,483 B2 | 7/2013 | Nishihara | |
| 8,610,808 B2 | 12/2013 | Prescher et al. | |
| 8,633,996 B2 | 1/2014 | Charbon et al. | |
| 8,648,287 B1 | 2/2014 | Fossum | |
| 8,772,730 B2 | 7/2014 | Han et al. | |
| 8,779,342 B2 | 7/2014 | Denham | |
| 8,829,409 B2 | 9/2014 | Wadsworth | |
| 9,001,231 B2 | 4/2015 | Lu et al. | |
| 9,001,251 B2 | 4/2015 | Smith et al. | |
| 9,055,247 B2 | 6/2015 | Nishihara | |
| 9,185,311 B2 | 11/2015 | Shen | |
| 9,225,918 B1 | 12/2015 | Fossum | |
| 9,236,409 B2 | 1/2016 | Aleksic | |
| 9,344,635 B2 | 5/2016 | Vogelsang et al. | |
| 9,374,541 B2 | 6/2016 | Nishihara | |
| 9,380,245 B1 | 6/2016 | Guidash et al. | |
| 9,438,826 B2 | 9/2016 | Xue et al. | |
| 9,491,391 B2 | 11/2016 | Smith et al. | |
| 9,513,382 B2 * | 12/2016 | Nishihara | H01L 27/14609 |
| 9,521,338 B2 | 12/2016 | Vogelsang et al. | |
| 9,521,351 B1 | 12/2016 | Endsley et al. | |
| 9,679,929 B2 * | 6/2017 | Lee | H01L 27/14609 |
| 9,723,237 B2 * | 8/2017 | Nishihara | H04N 5/32 |
| 2002/0196170 A1 | 12/2002 | McIlrath | |
| 2008/0074523 A1 | 3/2008 | Panicacci | |
| 2010/0320369 A1 | 12/2010 | Koskinen et al. | |
| 2011/0050969 A1 | 3/2011 | Nishihara | |
| 2012/0138774 A1 | 6/2012 | Kelly et al. | |
| 2012/0307121 A1 | 12/2012 | Lu et al. | |
| 2014/0034809 A1 | 2/2014 | Shen | |
| 2014/0054446 A1 | 2/2014 | Aleksic | |
| 2014/0103190 A1 | 4/2014 | Lee et al. | |
| 2014/0158863 A1 | 6/2014 | Guidash | |
| 2014/0175264 A1 | 6/2014 | Xue et al. | |
| 2014/0211058 A1 | 7/2014 | Nishihara et al. | |
| 2014/0293102 A1 | 10/2014 | Vogelsang et al. | |
| 2014/0293107 A1 | 10/2014 | Nishihara et al. | |
| 2014/0313387 A1 | 10/2014 | Vogelsang et al. | |
| 2016/0028985 A1 | 1/2016 | Vogelsang et al. | |
| 2016/0241805 A1 * | 8/2016 | Nishihara | H04N 5/32 |
| 2017/0289477 A1 * | 10/2017 | Nishihara | H04N 5/32 |

OTHER PUBLICATIONS

Frohmader, K. P. "A Novel MOS-Compatible Light-to-Frequency Converter Suited for Monolithic Integration", IEEE Journal of Solid State Circuits, vol. 17, No. 3, pp. 588-591, Jun. 1982. 4 pages.

Ignjatovic et al., "Low Power, High Dynamic Range CMOS Image Sensor Employing Pixel-Level Oversampling Sigma Delta Analog-to-Digital Conversion," IEEE Sensors Journal, vol. 12, No. 4, pp. 737-746, Apr. 2012. 10 pages.

Kavusi et al., "Quantitative Study of High Dynamic Range Image Sensor Architectures," Proc. of SPIE-IS&T Electronic Imaging 2004, SPIE vol. 5301, pp. 264-275, Jan. 2004. 12 pages.

Kavusi, Sam et al., "Quantitative Study of High Dynamic Range Sigma Delta-based Focal Plane Array Architectures", Proceedings of SPIE 5406, pp. 341-350, 2004. 10 pages.

Lai, Cheng-Hsiao, et al., "A 1.2-V 0.25-um Clock Output Pixel Architecture With Wide Dynamic Range and Self-Offset Cancellation", IEEE Sensors Journal, vol. 6, No. 2, Apr. 2006, pp. 398-405. 8 pages.

Sbaiz et al., "The Gigavision Camera," IEEE Conference on Acoustics, Speech, and Signal Processing, Apr. 2009. 4 pages.

Yang, Feng et al., "Bits from Photons! Oversamp'ed Image Acquisition Using Binary Poisson Statistics", IEEE Transac-tions on Image Processing, vol. 21, No. 4, pp. 1421-1436, Apr. 2012. 16 pages.

* cited by examiner

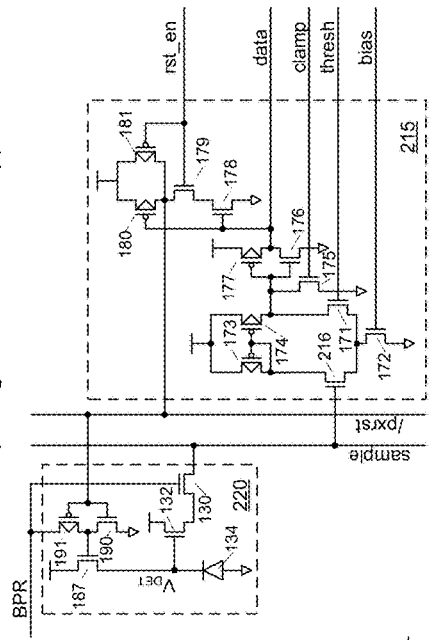
FIG. 2C (voltage-mode sense-amp)
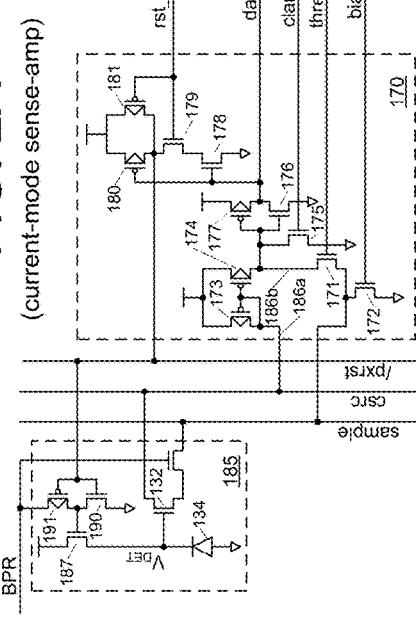
FIG. 2A (current-mode sense-amp)
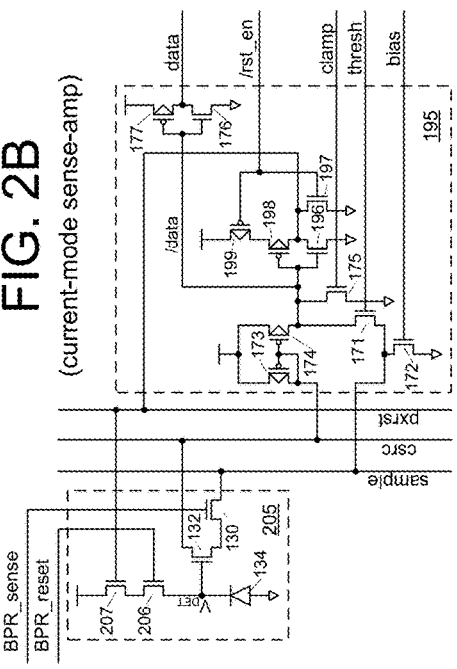
FIG. 2B (current-mode sense-amp)

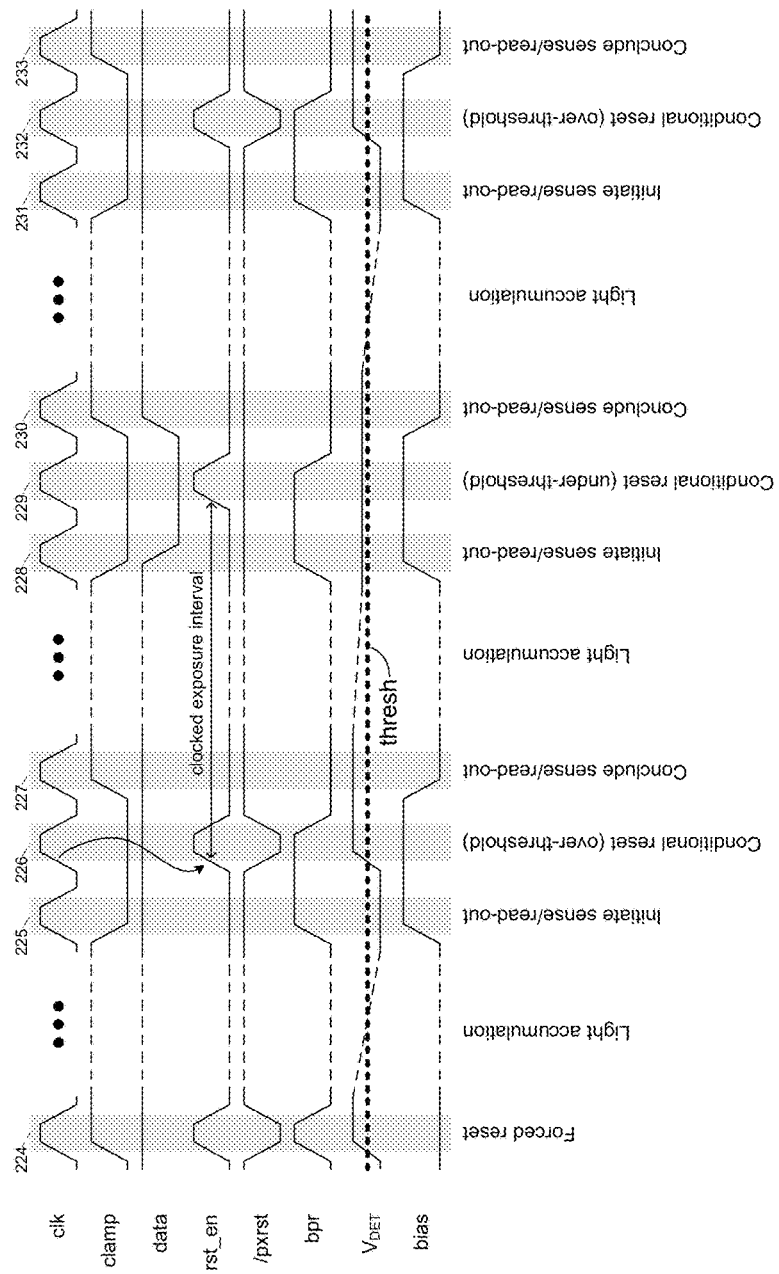

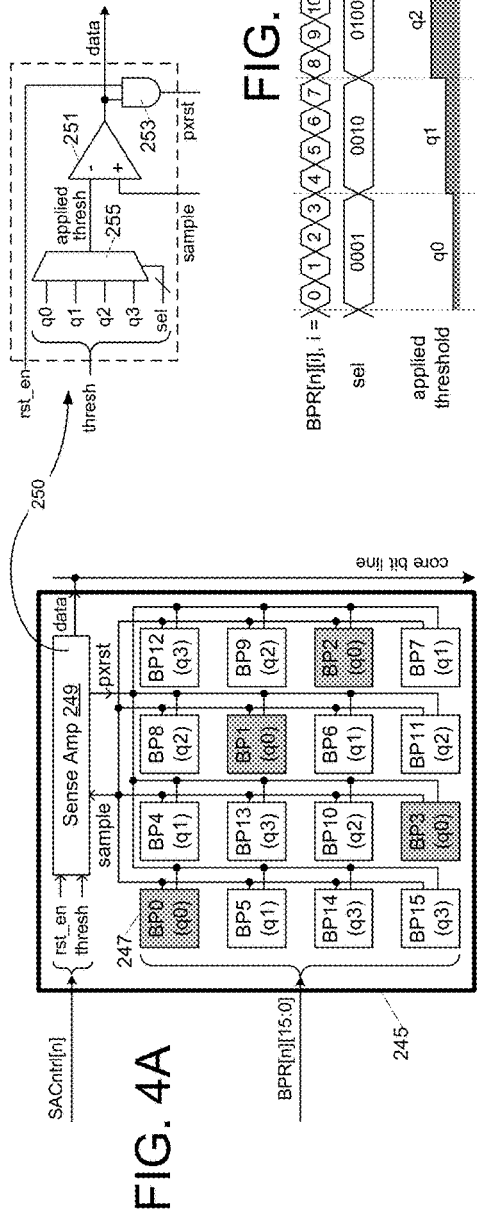
FIG. 4A
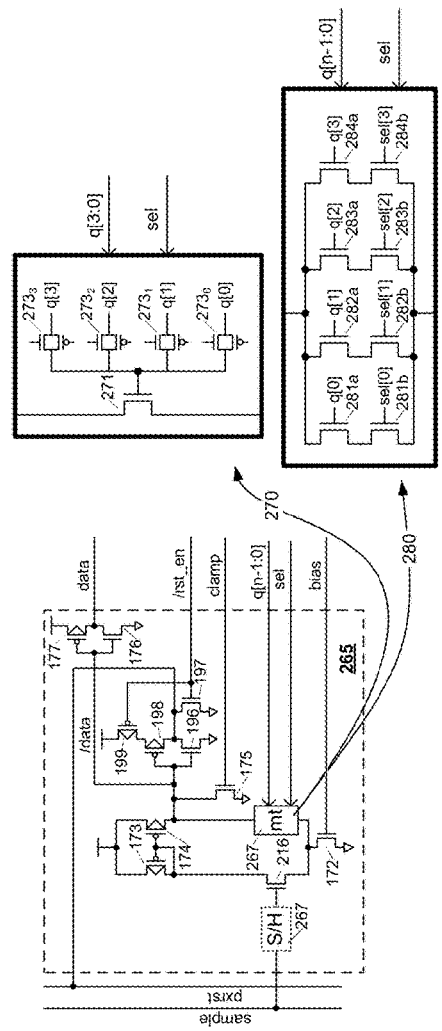
FIG. 4B
FIG. 5

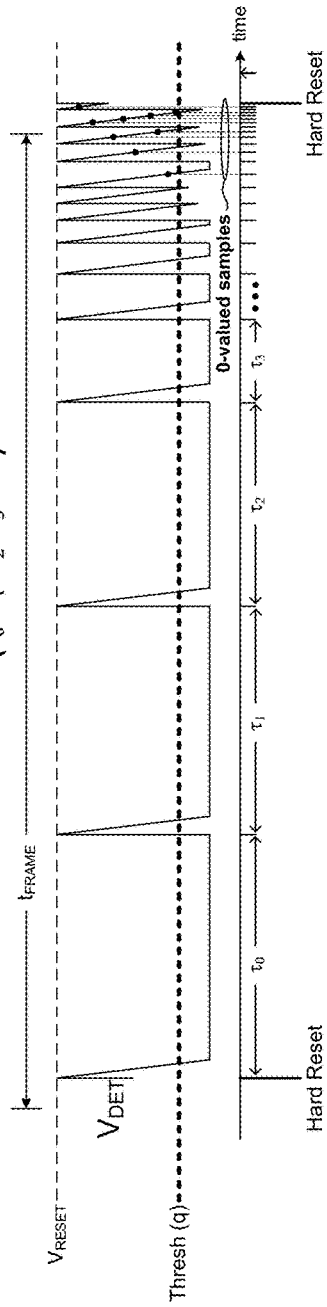
FIG. 11
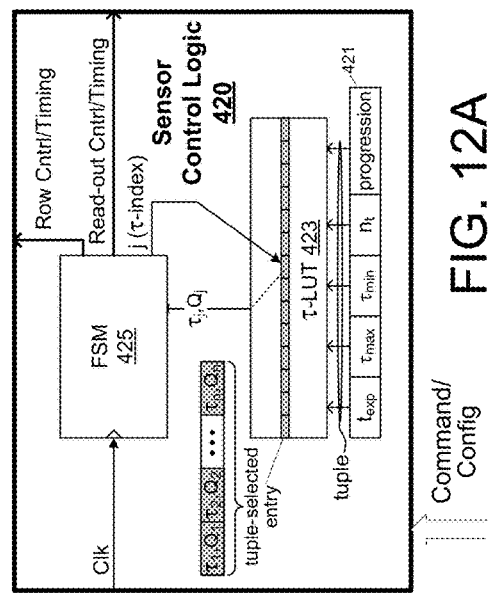
FIG. 12A
FIG. 12B

Non-Uniform Δτ Progression

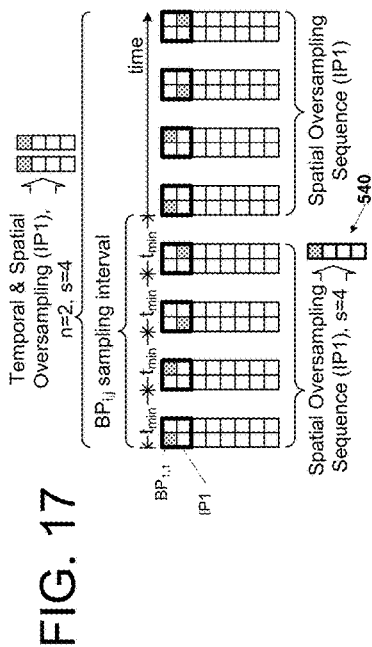
FIG. 16
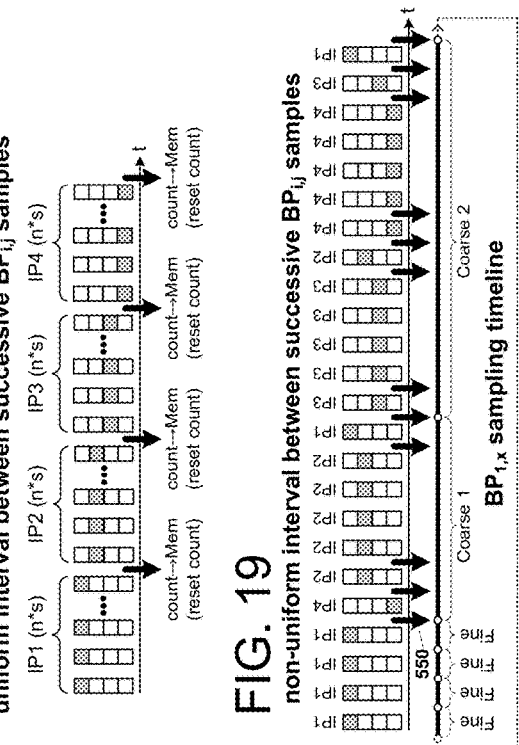
FIG. 17
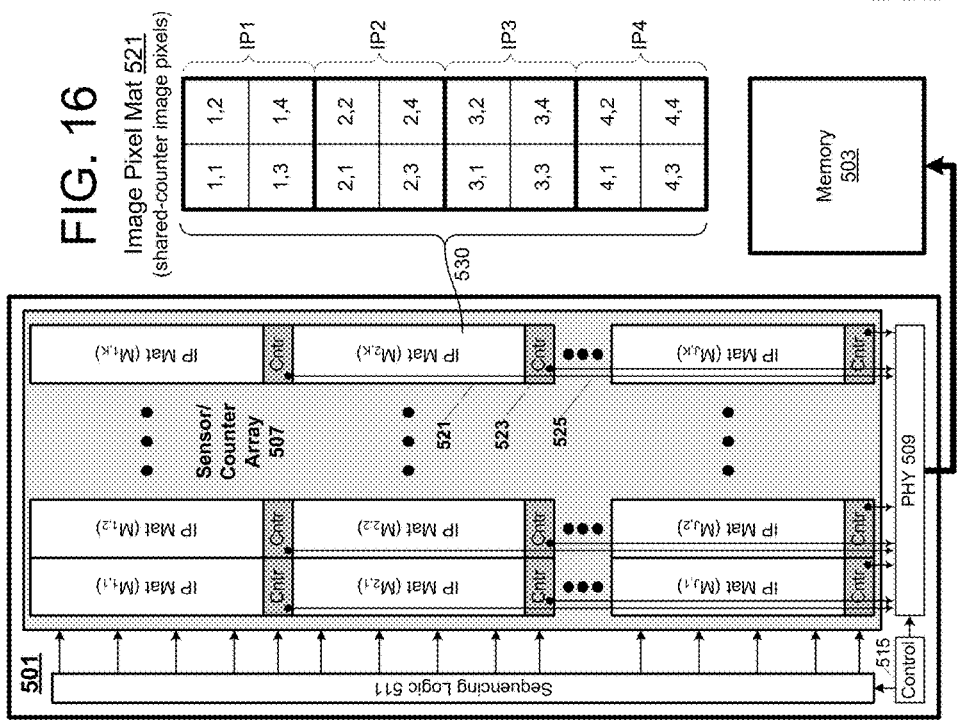
FIG. 18
FIG. 19

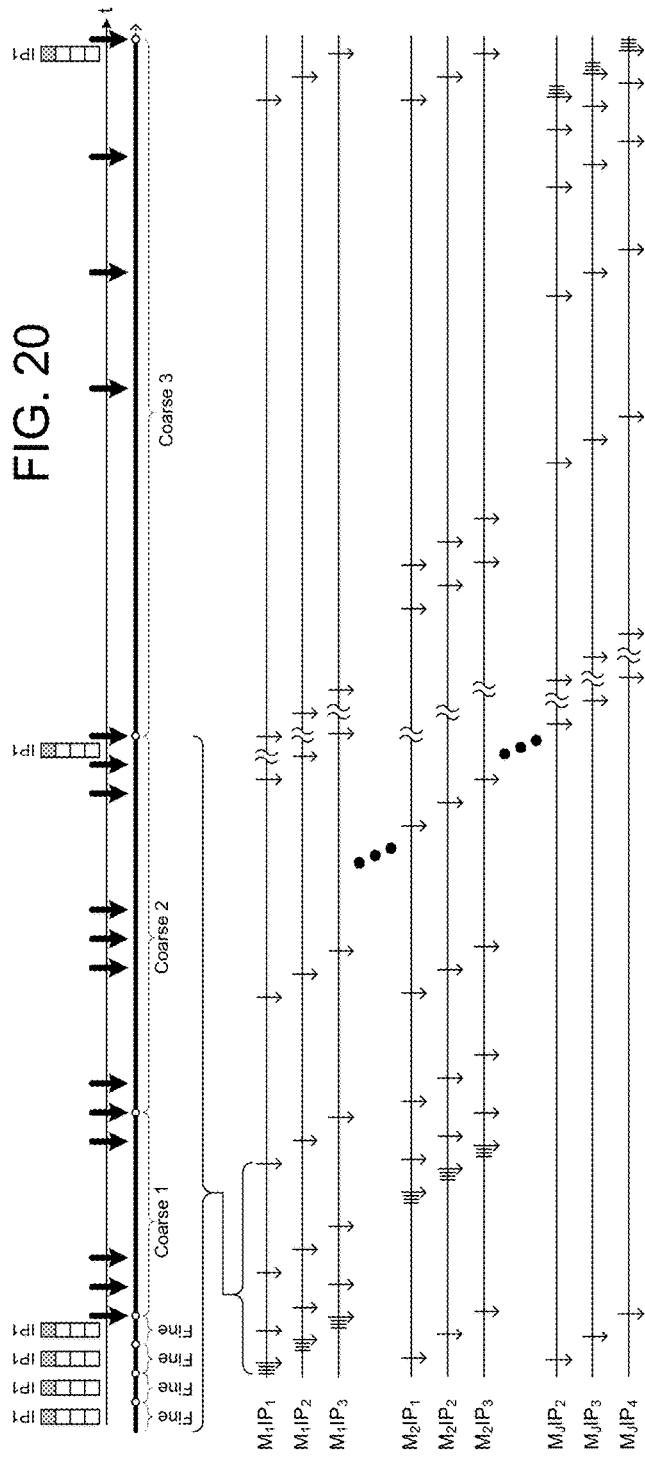
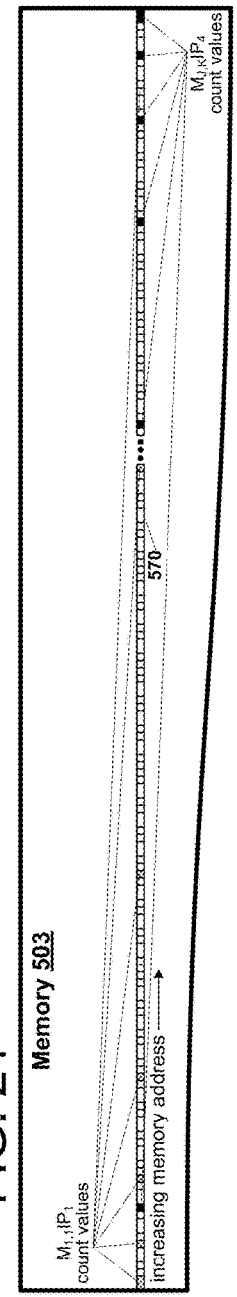

SHARED-COUNTER IMAGE SENSOR

CROSS REFERENCE TO RELATED APPLICATIONS

This application is a continuation of U.S. patent application Ser. No. 14/686,697, filed Apr. 14, 2015 and entitled "Shared-Counter Image Sensor" (now U.S. Pat. No. 9,826, 176), which is a continuation of U.S. patent application Ser. No. 13/864,427, filed Apr. 17, 2013 and entitled "Shared-Counter Image Sensor" (now U.S. Pat. No. 9,036,065) which claims priority to (i) U.S. Provisional Application No. 61/684,117, filed Aug. 16, 2012 and entitled "Binary Pixel Image Sensor Sampled At Non-Uniform Intervals" and (ii) U.S. Provisional Application No. 61/700,119, filed Sep. 12, 2012 and entitled "Shared-Counter Image Sensor." Each of the foregoing patent applications is hereby incorporated by reference.

TECHNICAL FIELD

The present disclosure relates to the fields of electronic image sensors and digital image processing.

BACKGROUND

Despite ubiquitous application, conventional CMOS image sensors suffer from a number of limitations. First, the linear relationship between photon strikes and pixel value yields a relatively small dynamic range in which a pixel quickly reaches saturation under brightening conditions. Additionally, because the maximum number of detectable photon strikes is proportional to pixel size, the pixel footprint is dictated by the dynamic range required in a given application and does not scale with shrinking process geometries. In high-end digital cameras, like DSLRs (digital single-lens reflex) for example, the photo diode tends to be four or more micrometers at each edge in order to achieve a reasonable dynamic range, consuming an area hundreds or even thousands of times the minimum transistor size permitted by leading logic process geometries.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIGS. 2A-2C illustrate embodiments of conditional-reset sense amplifiers and corresponding binary pixels that may be employed to achieve variable temporal oversampling within a binary pixel image sensor;

FIG. 3 is a timing diagram illustrating an exemplary operation of a sense-amp super pixel that includes the conditional-reset sense amplifier and binary pixel of FIG. 2A;

FIG. 4A illustrates an embodiment of a conditional-reset sense-amp super pixel that applies multiple reference voltages to respective subsets of binary pixels to effect spatially-distributed, non-uniform thresholds;

FIG. 4B illustrates an exemplary read-out sequence that may be executed with respect to the conditional-reset sense-amp super pixel of FIG. 4A;

FIG. 5 illustrates an embodiment of a multi-thresholding, conditional-reset sense amplifier that may be employed within the sense-amp super pixel (SSP) of FIG. 4A;

FIG. 11 illustrates an approach for extending the dynamic range of a conditional-reset binary pixel;

FIG. 12A illustrates a sensor control logic embodiment that may be used to implement the control logic of FIG. 1 in a binary pixel image sensor having non-uniform sampling intervals;

FIG. 12B illustrates an exemplary flow of the finite state machine of FIG. 12A;

FIG. 16 illustrates an alternative embodiment of a binary pixel image sensor having a shared-counter architecture;

FIG. 17 illustrates a spatial/temporal oversampling sequence with respect to an image pixel of the image pixel mat detailed in FIG. 16;

FIG. 18 illustrates a sequence of pixel-count transfer and counter reset operations that may be executed within the image sensor of FIG. 16, with the output of a pixel mat counter being transferred to memory and the counter reset after each 'n' successive spatial oversampling sequences with respect to a given image pixel;

FIG. 19 illustrates an exemplary pixel sampling sequence in which each image pixel within a pixel mat is sampled with three different sampling intervals over the course of an exposure time, including a number of fine sampling intervals and progressively extended first and second coarse sampling intervals;

FIG. 20 illustrates an exemplary data-transfer sequence effected by time-staggering the sample-sequencing of image pixel mats that share a common resource to align data transfer bursts from one pixel mat with a non-burst interval of another;

FIG. 21 illustrates an exemplary storage of fractional image pixel count values within the memory component of FIG. 16.

FIG. 22 illustrates an alternative image sensor architecture in which two rows of image pixel mats are operated in parallel, with each pair of co-operated image pixel mats forming a double mat;

FIG. 23 illustrates a stacked-die implementation of an image sensor that may be used to implement the generalized image sensors of FIGS. 1 and 16;

FIG. 24 illustrates the different pixel clock and transmit clock domains described in reference to FIG. 1; and FIG. 25 illustrates an image system architecture that may be used to implement the image sensor, image data storage and image reconstruction functions described above in reference to FIG. 1.

DETAILED DESCRIPTION

In various digital image sensor embodiments disclosed herein, pixels are clustered together with an embedded sense amplifier and sensed with respect to a binary threshold to yield a collection of single-bit pixel values that can be combined to form the output of an image pixel. Because integrated-circuit (IC) process geometries permit pixel sizes below the diffraction limit of visible light, a photon striking within a SDL cluster of such "binary" pixels may activate (i.e., be detected by and exceed the threshold of) one binary pixel but not others illuminated by the same blurred source, thus decreasing the number of non-activated pixels available to detect subsequent photons from the source. Consequently, when exposed to a stationary photon flux, the rate of pixel activation slows as the exposure interval transpires (i.e., due to photons striking already activated pixels), thereby yielding a logarithmic rather than linear sensitivity profile and thus a potentially much higher dynamic range than achieved through prior-art techniques (in other embodiments disclosed herein this behavior is modified while still improving dynamic range). Further, because the pixels can be scaled with decreasing process geometries, pixel densities can increase freely with process improvement, thus overcoming physical impediments faced by conventional architectures and enabling dramatically higher performance in future generations of imaging devices. In other embodiments, counter circuits for accumulating pixel sample values are shared among multiple groups of pixels, thus enabling sample data compression and increased temporal oversampling without an impractically large number of counter circuits. These and other advantages, features and embodiments are described below.

Figure 1:
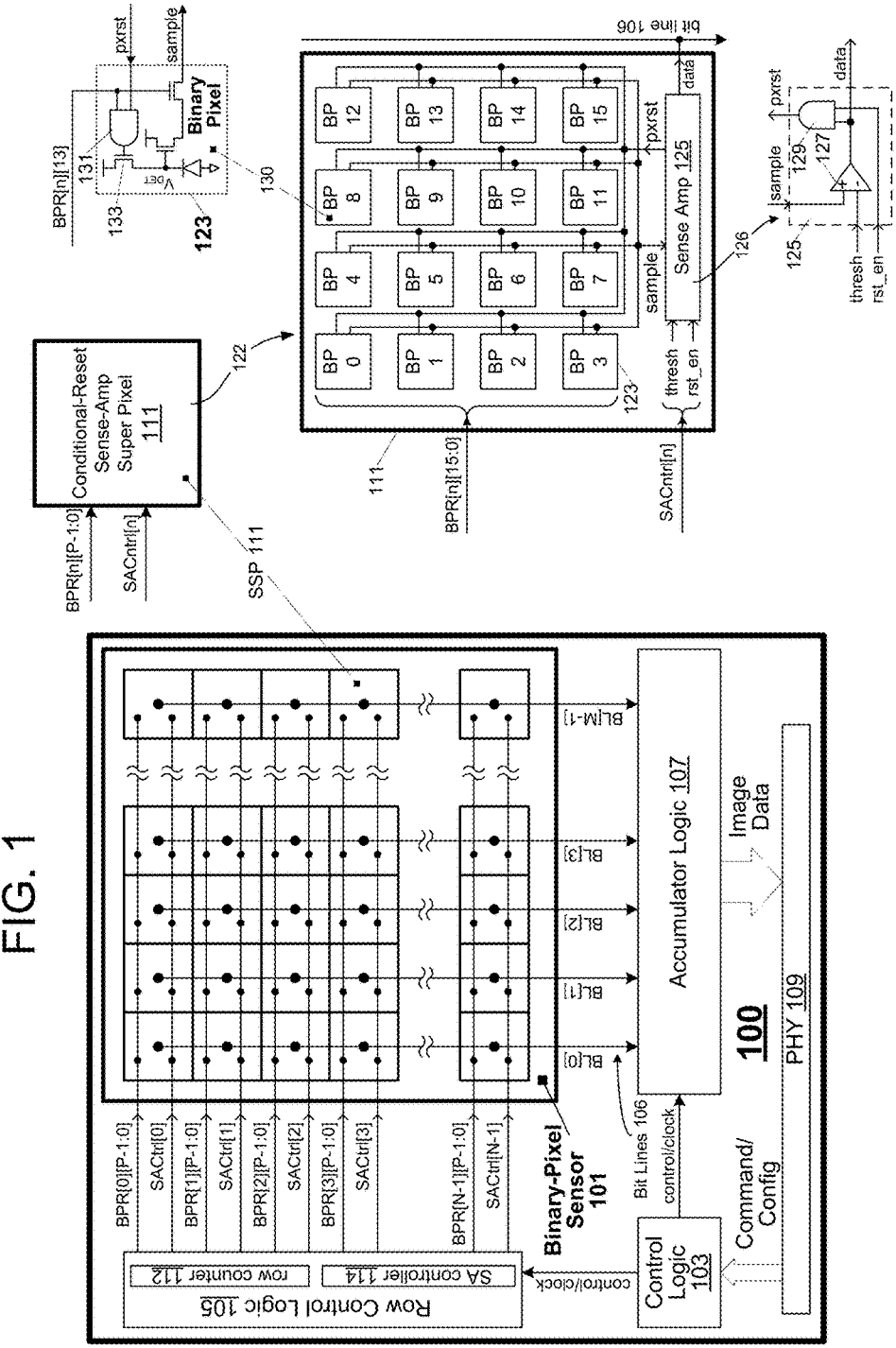
FIG. 1 illustrates an embodiment of an integrated-circuit image sensor (image sensor IC) having a binary-pixel image sensor together with circuitry to manage sensor operations and communicate with a host integrated circuit.

FIG. 1 illustrates an embodiment of a sensor IC 100 having a binary-pixel image sensor 101 together with circuitry to manage sensor operations and communicate with a host IC. More specifically, a physical signaling interface 109 (PHY) is provided to receive commands and configuration information from a host IC (e.g., a general-purpose or special-purpose processor, application-specific integrated circuit (ASIC) or any other control component) and control logic 103 is provided to execute incoming commands within an operating configuration set in response to the configuration information. For purposes of example, the sensor IC and host IC are assumed to form the primary image acquisition components within a camera (e.g., a still-image or video camera within a mobile device, compact camera, digital SLR camera, stand-alone or platform-integrated webcam, high-definition video camera, security camera, automotive camera etc.). The sensor IC and host IC can be more generally deployed alone or together with like or different imaging components within virtually any imaging system or device including without limitation metrology instruments, medical instruments, gaming systems or other consumer electronics devices, military and industrial imaging systems, transportation-related systems, space-based imaging systems and so forth.

Continuing with FIG. 1, control logic 103 issues control and clock signals to row control logic 105 and output logic 107. As shown, the row control logic includes a row counter 112 to sequence through the rows of SSPs 111 within the image sensor during image acquisition and read-out operations, and a sense-amp controller 114 to control sensing for respective SSPs during those operations. Accumulator logic 107 receives pixel sample values via bit lines 106 and accumulates sample values obtained from respective pixels (or SSPs) into respective image data values, for example, by summing or otherwise combining temporally oversampled outputs from individual pixels or SSPs. PHY 109 serializes data read-out from image sensor 101 for transmission to a memory component, host IC and/or other processing component via a relatively narrow external signal path. This operation is discussed in greater detail below.

In the embodiment of FIG. 1, binary-pixel image sensor 101 is composed of N rows and M columns of sense-amp super pixels (SSPs), with each SSP including an embedded sense amplifier and P binary pixels. Row counter 112 outputs N sets of P row signals, with each set of P row signals coupled to the binary pixels that populate a logical or physical row of SSPs. More specifically, each signal within the set of P row signals is coupled to a respective one of the P binary pixels within each SSP of the row, thereby enabling M like-positioned binary pixels within respective SSPs of a given row to be selected as a group during precharge and sense operations. The logical collection of binary pixels selected in response to assertion of a given one of the row signals is referred to herein as a "binary pixel row" to distinguish it from the rows of SSPs themselves (which each may contain one or more binary pixel rows). The individual row signals are referred to accordingly as binary-pixel-row (BPR) signals with each set of P BPR signals being indexed by a respective SSP row index 'n' that ranges from 0 to N−1, and each BPR signal within a given set of P BPR signals being further indexed by a binary pixel index, 'p' that ranges from 0 to P−1.

In one embodiment, row control logic 105 includes state logic that sequences between states to control the operation of row counter 112 and sense amp controller 114, for example, incrementing row counter 112 to select the next binary pixel row in an incremental progression after enabling sense amp controller 114 to complete a sequence of operations with respect to the binary pixels of the currently indexed binary pixel row. The sense-amp controller itself outputs respective sets of sense amp control signals (SACtrl [N−1:0]) to the rows of SSPs with each set of sense-amp control signals including constituent signals to enable the embedded sense amplifiers within a selected SSP row to be operated in parallel, in one embodiment for example, sequencing as a unit through precharge, sense and read-out states as detailed below.

Reflecting on the image sensor architecture shown in FIG. 1, it can be seen that a significant number of conductors can overlay the image sensor to instantiate the BPR lines, sense-amp control lines and core bit lines shown. In one embodiment, the backside of the die on which the image sensor is formed is ground (or lapped or otherwise thinned) to a thickness that permits pixel exposure through the backside of the die, thereby enabling accumulation of light unimpeded by the image sensor wiring. In such an embodiment, the front-side of the ground die can be adhered to a substrate or to the die of another IC (e.g., a host IC) to provide mechanical stability.

In the embodiment of FIG. 1, each sense-amp super pixel 111 includes pixel reset logic that conditionally resets individual pixels of the SSP according to their sample values. More specifically, if the sample obtained from a given pixel indicates that the binary threshold has been exceeded (i.e., pixel saturated), the pixel is reset (i.e., photodiode or other light-detecting element precharged) to enable further photon detection. Otherwise, if the sample indicates that the binary threshold has not been exceeded, the pixel state is left unchanged (i.e., no reset event). Through this conditional-reset operation, individual pixels within the SSP and the pixel array as a whole are reset at varying times throughout an exposure interval (i.e., recycling the well of the photodiode or other light-detecting element to enable further photon strike detection), and are thus temporally oversampled at an effective rate that varies according to the number of pixel resets within a given exposure interval.

Each conditional-reset SSP receives binary pixel row signals (BPR[n][P−1:0]) and sense amp control signals (SACntrl[n]) corresponding to an 'nth" SSP row within image sensor 101 and, when enabled, outputs pixel data onto a core bit line 106 to be counted within accumulator logic 107 for eventual output via PHY 109. In the exemplary embodiment shown, conditional-reset SSP 111 includes an embedded sense amplifier 125 coupled to sixteen binary pixels through one or more sample lines ("sample") and one or more pixel reset lines ("pxrst"). Though shown at the margin of SSP 111, sense amplifier 125 may alternatively be distributed among binary pixels 123. As in all embodiments, more or fewer binary pixels 123 may be present than those shown.

The sense amp control signals (SACntrl) provided to embedded sense amplifier 125 include, in addition to other signals discussed below, a digital or analog threshold signal ("thresh") and a reset-enable signal ("rst_en"). The threshold and reset-enable signals are applied within the sense amplifier as shown conceptually at 126. That is, comparator circuitry 127 compares a threshold (conveyed or selected by the threshold signal) with a binary pixel value driven onto the sample line (i.e., by a binary pixel selected by assertion of a corresponding BPR signal) to produce a pixel data signal ("data") which, in turn, is ANDed with the reset-enable signal in logic 129 to drive the pixel reset line. By this operation, a reset signal is asserted on the pixel reset line to reset the selected binary pixel only if that binary pixel has received sufficient light to yield an over-threshold binary pixel value. Because the conditional pixel reset events are synchronized by the timing of the reset-enable signal (itself asserted, for example, at regular intervals within a sequence of pixel cycles), the effective exposure interval for a given binary pixel is established at a predetermined number of clocked exposure intervals.

Referring to detail view 130 of a binary pixel 123, the pixel reset line is coupled to pixel reset logic 131 where it is logically ANDed with a pixel-specific control signal (e.g., the binary pixel row signal for the subject pixel, though a different control signal may alternatively be used) to selectively switch on reset transistor 133 and thereby couple the detection node of the pixel ("VDET") to a precharge voltage source. Accordingly, when the pixel reset signal is asserted by the sense amplifier (i.e., in response to a binary pixel value that exceeds the sampling threshold), and the pixel-specific control signal is also asserted, the binary pixel is reset. Through this operation, each of the binary pixels within conditional-reset SSP 111 may be reset at different times and thus accumulate light without reset over disparate numbers of clocked exposure intervals in accordance with their respective photon absorptions.

FIGS. 2A-2C illustrate embodiments of conditional-reset sense amplifiers and corresponding binary pixels that may be employed to achieve variable temporal oversampling within a binary pixel image sensor. FIG. 2A illustrates a current-mode sense amplifier 170 can be employed, together with multiple instances of binary pixel 185, to form a sense-amp super pixel. Instead of employing back-to-back inverters (as may be done in an alternative embodiment), the sense amplifier is formed by a differential amplifier. Thus, no latching operation occurs, avoiding the need for a sense amp precharge operation. Also, the amplification transistor 132 within binary pixel 185 operates as the input transistor of the differential pair, in effect distributing a portion of the differential amplifier within the binary pixels of the SSP (in alternative embodiments, a dedicated input transistor may be provided within the sense amplifier as a counterpart to transistor 171).

Due to the potentially imbalanced legs of the differential amplifier (i.e., one leg effected through the binary pixel via sample and current-source lines ("sample" and "csrc") and thus through a longer signal path than the other leg, which is confined within the locale of the sense amplifier), transistors 173 and 174 are coupled in a current mirror configuration to establish matching current sources for the two legs. Accordingly, when a bias voltage is applied to transistor 187, powering the sense amplifier, a differential voltage is developed on differential nodes 186a, 186b according to whether the pixel voltage (i.e., the voltage at the detection node of photosensitive element 134) is greater or less than a threshold voltage applied to the gate of transistor 171. More specifically, complement-data node 186b drops to a lower potential than counterpart node 186a if the pixel voltage is below the threshold (i.e., transistor 132 will exhibit a lower transconductance (higher resistance) than transistor 171 due to the difference in their gate voltages and thus effect a higher IR drop than transistor 171) and conversely rising to a higher potential than node 186a if the pixel voltage is above the threshold. An inverter formed by transistors 176 and 177 amplifies the potential on complement-data node 186b, outputting a data signal representative of the binary pixel state (e.g., to a core bit line).

Sense amplifier 170 additionally includes conditional-reset circuitry to assert an active-low pixel-reset signal if the binary pixel value exceeds (i.e., detection node voltage is lower than) the sampling threshold, thus enabling a conditional reset operation within the attached pixel. More specifically, the data output of the sense amplifier and a reset-enable signal ("rst_en") are supplied to a logic NAND circuit formed by transistors 178, 179, 180 and 181, switching on transistors 178 and 179 and switching off transistors 180 and 181 to pull the pixel reset line ("/pxrst") low if the sense amp data output (generated by inverter transistors 176 and 177) and reset-enable signals are both high. Conversely, the NAND circuit pulls the pixel reset line high (to a deasserted state) via transistor 181 or 180 (and switching off at least one of transistors 178 and 179) if either of the data output or the reset-enable signal are low.

Within binary pixel 185, the active-low state of the pixel reset line switches on logic AND transistor 191, thereby passing the state of the binary pixel row signal to the gate of reset transistor 187. Accordingly, reset transistor 187 is switched on to reset (i.e., precharge) the binary pixel when the pixel-reset line is pulled low and the binary pixel row signal is asserted. Altogether, when the binary pixel row signal is raised to enable the binary pixel value to be sampled (i.e., enabling the charge level of the detection node onto the sample line) and the binary pixel value exceeds the sampling threshold such that a logic '1' is generated at the sense amp data output, then a concurrent assertion of the reset-enable signal will, in conjunction with the over-threshold binary pixel value, pull the pixel-reset line low to effect a pixel reset operation within the binary pixel selected by the asserted binary pixel row signal. When the pixel reset signal is high, pull-down transistor 190 is switched on within binary pixel 185 to ground the gate of reset transistor 187 and thus prevent reset regardless of the state of the binary pixel row signal.

As noted above, the reset-enable signal and threshold value constitute a subset of the sense-amp control signals provided to the sense amplifier within a given sense-amp super pixel. In the embodiment of FIG. 2A, the sense-amp control signals additionally include a clamp signal that is asserted between pixel sampling events to switch on transistor 175, coupling the output node of the differential amplifier (i.e., drain of transistor 171) to ground and thus avoiding a floating input to the inverter formed by transistors 176 and 177 (preventing, among other things, a metastable output on the data line). The bias signal is applied to the gate of current-sinking transistor 172 to effect a desired amplification level within the sense amplifier. In one embodiment, the bias signal is an analog voltage generated, for example, by a current mirror or other bias-control circuit to establish (in conjunction with current-mirror coupled load transistors 173, 174) a desired bias current within the differential amplifier. In an alternative embodiment, the bias signal is a multi-bit digital signal that is applied to a bank of parallel transistors (represented symbolically by transistor 172) so that, as the number of logic '1' bits within the bias signal is increased or decreased, a corresponding number of transistors within the parallel bank are switched on to establish a corresponding bias current. In either implementation, calibration operations may be performed at system startup and/or occasionally thereafter to establish/maintain an appropriate bias signal setting.

FIG. 2B illustrates an alternative embodiment of a conditional-pixel-reset sense amplifier 195 and conditionally-resettable binary pixel 205. Sense amplifier 195 works similarly to the sense amplifier of FIG. 2A, except that transistors 196, 197, 198 and 199 are provided to logically AND an active-low reset-enable signal (/rst_en) and the complement data signal output from the differential amplifier pair (i.e., from the drain of transistor 171). That is, when the reset-enable signal is lowered, transistor 199 is switched on to power the inverter formed by transistors 196 and 198. Consequently, when the complement data signal is low (i.e., the binary pixel output exceeds the sampling threshold), the inverter output goes high (i.e., transistor 198 is switched on, while transistors 196 and 197 are switched off), thereby driving the pixel reset line high to effect a pixel reset.

In contrast to the embodiment of FIG. 2A, the pixel reset logic within binary pixel 205 is formed by only two transistors (not three), but is controlled by a pixel-row reset signal (BPR_reset) that is distinct from the binary pixel row signal used to enable the detection node voltage to be sensed (i.e., "BBR_sense" in the embodiment shown). More specifically, the AND transistor 191 and pull-down transistor 190 shown in FIG. 2A are omitted in favor of an additional reset transistor 206 coupled between sense-amp-controlled reset transistor 207 (which corresponds to transistor 187 in the embodiment of FIG. 2A) and the detection node. The two reset transistors 206, 207 are coupled to the pixel-row reset input (BPR_reset) and the pixel reset line (pxrst), respectively, so that, when both inputs are high, the detection node of the binary pixel is switchably coupled to a precharge voltage source (e.g., $V_{DD}$) to reset the binary pixel.

Still referring to FIG. 2B, in an alternative embodiment a single binary pixel row signal may be supplied to the gates of access transistor 130 and reset transistor 206, provided that any charge trapped in the source-to-drain coupling between the two reset transistors 206 and 207 (i.e., trapped by virtue of pixel reset signal assertion in connection with other binary pixels of the SSP) does not intolerably disturb the pixel sampling result.

FIG. 2C illustrates another alternative embodiment of a conditional-pixel-reset sense amplifier 215 and conditionally-resettable binary pixel 220. In this case, the sense amplifier works as a voltage mode amplifier instead of a current mode amplifier by virtue of local amplifying transistor 216. Because the differential amplifier sensing current passes through amplifying transistor 216 instead of transistor 132 within binary pixel 220, transistor 132 may be tied high as shown and thus operated as a follower amplifier (providing an output to the gate of amplifying transistor 216 via access transistor 130) that follows the state of the detection node. While a follower amplifier is shown, in all such in-pixel amplifying arrangements, the gain of the amplifying transistor or amplifying circuit may be greater than, less than or equal to one. Also, while the conditional pixel reset circuitry within the binary pixel and sense amplifier corresponds to that shown in FIG. 2A, the approaches described in reference to FIG. 2B can be employed in alternative embodiments.

FIG. 3 is a timing diagram illustrating an exemplary operation of an SSP that includes the conditional-reset sense amplifier and binary pixel of FIG. 2A. Operations within the SSP are executed synchronously with respect to a clock signal (clk) and are shown as a sequence of shaded events (224-233) in respective clock cycles. Initially, at 224, a forced reset is executed with respect to the binary pixel by asserting (raising) the clamp, reset (rst_en) and binary pixel row signals while deasserting the bias signal, thus forcing a low output from the differential amplifier to emulate an over-threshold condition and trigger a pixel reset. That is, referring briefly to FIG. 2A, the high data output of inverter 176/177 is NANDed with the reset-enable signal to drive the pixel-reset line low, which, in combination with the asserted binary pixel row (bpr) signal, produces a high signal at the gate of the reset transistor 187 to reset the binary pixel (charge or pre-charge the detection node).

Following the pixel reset at 224, the binary pixel is exposed over a light accumulation interval. Note that the light accumulation interval may span many clock cycles as explained above and thus the detection node voltage is shown as having a steady declining slope—in actuality, the detection node voltage will decrease stepwise in response to non-uniformly spaced photon strikes. At 225, the clamp signal is lowered while the bias and binary pixel row signals are raised, thereby initiating a pixel sense/read-out operation. Because the detection node voltage has dropped to a level below the threshold voltage (shown as a steady-state signal level superimposed over the detection node voltage), the differential amplifier generates a logic low output that is inverted to form a logic '1' binary pixel sample. In the embodiment shown, the binary pixel sample is output ("data") onto a core bit line (i.e., to be counted by an on-chip or off-chip ASP accumulator) over a pair of clock cycles before the bias and binary pixel row signals are lowered (and the clamp signal raised) to conclude the sense/read-out operation at 227. In the second clock cycle of the read-out interval, after the binary pixel sample value has stabilized at the sense amp data output, a conditional reset operation is executed as shown at 226. More specifically, the reset signal is raised in response to the rising clock edge as shown, thus causing the NAND gate formed by transistors 178, 179, 180, 181 in FIG. 2A to assert or deassert an active-low pixel reset signal (driving the pixel reset line low or high, respectively) according to whether an over-threshold condition was detected with respect to the subject binary pixel. Accordingly, the logic '1' (over-threshold) binary pixel sample in the example shown triggers assertion of the active-low pixel reset signal, which, in combination with the continued assertion of the binary pixel row signal, effects a pixel reset.

The sense/read-out and conditional-reset operations are repeated at 228, 229 and 230 following a second light accumulation interval, but a lesser light accumulation yields an under-threshold detection node voltage (i.e., a detection node voltage that does not exceed—that is, go lower than—the threshold level). Consequently, the resulting logic '0' binary pixel sample yields a logic high (unasserted) pixel reset signal and thus no pixel reset occurs. Accordingly, at the conclusion of the sense/read-out at interval 230, the binary pixel is again allowed to accumulate light over an exposure interval, with the partially discharged detection node voltage produced in the preceding exposure interval being carried forward as the initial condition for the subsequent exposure interval. Consequently, even though the lower photon flux (i.e., lower than in the exposure preceding the sense operation at 225) continues, the non-reset during conditional reset interval 229 effectively joins the two clocked exposure intervals (i.e., the exposure interval between 227 and 228, and the exposure interval between 230 and 231) into a single effective exposure interval such that the detection node voltage at the subsequent sense/read-out interval 231 reflects the total number of photon strikes during those two clocked exposure intervals. In the example shown, the photon count over the last two clocked exposure intervals is sufficient to exceed the threshold and thus yields a logic '1' data output that contributes to the net ASP value and produces the pixel reset shown at 232. Though a photon accumulation without reset over two exposure intervals is shown, lower levels of photon flux may result in continuous photon accumulation over any number of clocked exposure intervals between one and the total image frame interval (or other maximum) before a forced reset is executed.

Mathematical analysis and simulation results indicate the potential for undesired regions of zero or near zero slope in the response curve of a variable temporal oversampling image sensor at low luminance due to the quantized nature of the temporal oversampling. In a number of embodiments, those errors and resulting output anomalies are mitigated or avoided altogether by effecting non-uniform sampling thresholds within the sensor. In a first set of non-uniform threshold embodiments, for example, different reference voltages are applied to respective binary pixels that contribute to a single image pixel to effect a spatial distribution of non-uniform thresholds. That is, each of the pixels is sampled with respect to a given reference voltage (threshold voltage) and thus yields a single-bit digital sample, but the reference voltage applied in at least one of the binary pixels differs substantially from the reference voltage applied in at least one other of the binary pixels during a given exposure interval, so that a range of reference voltages is applied to respective binary pixels. In another set of non-uniform threshold embodiments, binary pixels of varying sizes (i.e., exhibiting non-uniform light accumulation areas) are provided within each image pixel field to effect a spatial-distribution of non-uniform thresholds with a single reference voltage, thus avoiding the complexities and potential errors involved with generating multiple reference voltages. In yet another set of non-uniform threshold embodiments, different reference voltages are applied sequentially to the binary pixels of the image sensor in respective portions of the image frame period to effect a temporal rather than a spatial distribution of thresholds, thereby achieving the benefits of multiple reference voltages without the added wiring and in-situ reference selection circuitry required for spatial distribution of the reference voltages. Instead of or in conjunction with any of the non-uniform threshold embodiments, non-uniform thresholds can also be effected by varying the reset voltage applied to one or more of the binary pixels, either spatially or temporally. By intentionally "under-precharging" a binary pixel to a voltage that is closer to the comparison reference, the threshold is effectively lowered because fewer photon strikes are required to discharge the pixel to a voltage below the reference voltage.

FIG. 4A illustrates an embodiment of a conditional-reset SSP 245 that applies multiple reference voltages to respective subsets of binary pixels to effect spatially-distributed, non-uniform thresholds. In general, multiple sampling thresholds between $q_{min}$ (≥single-photon charge dissipation) and $q_{max}$ are determined by expected incident luminances, spatial and temporal oversampling factors and physical constraints on VLSI design and manufacture and applied to respective groups of binary pixels 247 within the SSP and thus within an image sensor as a whole. In a number of embodiments, the threshold distribution is determined so as to optimize a luminance fidelity metric, (e.g., minimize the signal to noise weighted by the expected probability of finding a given luminance level). In at least one such determination, for instance, all other parameters being equal, the distribution is dominated by low-threshold values in low-luminance conditions and by high-threshold values in high-luminance conditions. Once the number of binary pixels associated with each threshold value, 'q', has been determined, the spatial arrangement of all the binary pixels may be determined so as reduce spatial artifacts in the final rendered image, in particular to reduce aliasing artifacts. In one embodiment, for example, the spatial distribution of different-threshold binary pixels is chosen so as to minimize the peak of the two-dimensional Fourier transform of the image pixel sensitivity.

Still referring to FIG. 4A, SSP 245 operates generally as explained above in reference to FIG. 1, receiving a set of binary pixel row signals (BPR[n][15:0] in this example) and sense-amp control signals (SACntrl[n]), and executing conditional reset operations to effect variable temporal oversampling. Instead of receiving a single reference (threshold) voltage, however, the embedded sense amplifier 249 receives multiple reference voltages, depicted in detail view 250 as q0, q1, q2, q3 (or q[3:0]), and a select signal ("sel") that indicates which of the reference voltages is to be applied to establish the threshold for a given binary pixel sense/read-out operation. In the embodiment shown, sixteen binary pixels 247 are split into four threshold-groups with each of the four threshold groups being sensed in comparison to a respective one of the four thresholds, q0, q1, q2 or q3, as indicated within the label of the binary pixel. Further, the binary pixels 247 that constitute each of the four groups are spatially dispersed (or scattered) within the SSP such that each of the thresholds is applied to an expansive rather than a concentrated region within the SSP. In FIG. 4A, for example, the footprint of each subgroup extends to upper, lower, right and left edges of the binary pixel area; a region that can be envisioned, for example, by a box outline that includes each of the shaded binary pixels to which threshold q0 is applied.

In one embodiment, illustrated by the exemplary SSP read-out sequence in FIG. 4B, the binary pixel pixels of SSP 245 are read-out in a sub-group order that yields a stepwise increase in the applied threshold. That is, the binary pixels of sub-group 0 (BP0-BP3) are read out in the first set of four pixel sense/read-out operations, while the threshold select value is set to select reference voltage q0 as the applied threshold ("applied thresh"), a selection effected by selector element 255 as shown within detail view 250 of sense amplifier 249. After the sense/read-out of the binary pixels of sub-group 0 (each of which includes a comparison with the selected q0 threshold in comparator circuitry 251 to yield a data value that is ANDed with a reset-enable signal in logic 253 to yield a conditional pixel reset signal) is completed, the binary pixels of sub-group 1 (i.e., BP4-BP7) are read out while reference voltage q1 is selected as the applied threshold, then the binary pixels of sub-group 2, and finally the binary pixels of sub-group 3. In alternative embodiments, the sub-groups may be sensed and read-out in an order reverse of that shown (i.e., ramping the applied threshold down from q3 to q0) or in a scattered order in which the threshold select signal transitions as frequently as the binary pixel row signal. As the application of a given threshold in a binary pixel sense/read-out operation defines the subject binary pixel as being part of the threshold subgroup, the various different subgroup read-out sequences may be used to establish a desired distribution of binary pixel sub-groups within the SSP; distributions that may be programmably determined (e.g., by one or more fields within a threshold policy register) and thus changed in accordance with application requirements or dynamically according to ambient or other conditions.

FIG. 5 illustrates an embodiment of a multi-thresholding, conditional-reset sense amplifier 265 that may be employed within the SSP of FIG. 4A. In general, sense amplifier 265 operates as discussed in reference to FIG. 2C or 2A except that input transistor 171 of those sense amplifiers is replaced (or supplemented) by multi-threshold circuitry 267 ("mt"). In one implementation, shown for example in detail view 270, multi-threshold circuitry 267 includes an input transistor 271 corresponding to transistor 171 of FIG. 2C/2A together with a multiplexer (formed by pass gates 273₀-273₃) that applies one of the four incoming reference voltages (q[3:0] in this example) to the gate of input transistor 271 in accordance with the state of the threshold select signal, "sel." In alternative embodiments, single-transistor pass-gates (or other switching elements) may be used instead of the two-transistor pass gates shown, and more or fewer reference voltages may be provided.

Still referring to FIG. 5, an alternative embodiment of the multi-threshold reference circuitry includes parallel reference paths as shown in detail view 280. Each of the reference paths includes an input transistor (281a, 282a, 283a or 284a) coupled to receive a respective one of reference voltages q[0]-q[3] (again, there may be more or fewer reference voltages than the four shown), and an enable transistor (281b, 282b, 283b or 284b) coupled to receive a respective bit of the threshold select signal. By this arrangement, the threshold select signal may be output in one of four one-hot states (i.e., one bit set, the others cleared) to couple the input transistor of a selected one of the reference paths between transistors 174 and 172 of sense amplifier 265, thereby establishing the corresponding reference voltage as the applied threshold. Again, there may be more or fewer reference voltages (and corresponding reference paths) than the four shown. Also, an additional enable transistor may be disposed in series between transistors 173 and 172 of the sense amplifier and/or other loading element coupled to the drain terminal of bias transistor 172 for load matching purposes.

Figure 6A:
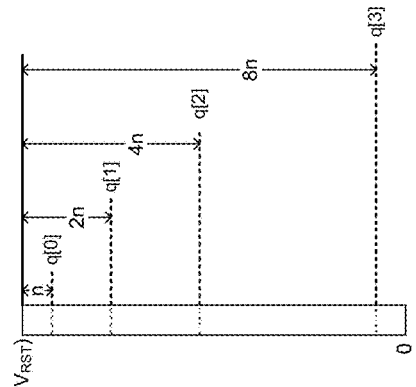
FIG. 6A illustrates an embodiment of a reference generator that may be used to generate the reference voltages supplied to the multi-threshold SSP of FIG. 4A and applied within the sense amplifier of FIG. 5.

FIG. 6A illustrates an embodiment of a reference generator 290 that may be used to generate the reference voltages supplied to the multi-threshold SSP of FIG. 4A and applied within the sense amplifier of FIG. 5. As shown, reference generator 290 includes a base register 291 to store a programmed or predetermined base reference value, "q-base," and a set of canonically coupled multipliers 293, 295, 297. The output of base register 291 and each multiplier 293, 295, 297 is supplied to a respective digital-to-analog converter (292, 294, 296, 298), thereby yielding a set of reference voltages having an amplitude $q[i]=q\text{-base}^{i*M}$, where i is the index of the reference voltage and M is the factor applied within each multiplier 293, 295, 297. In one embodiment, for example, M=2 so that each reference voltage is twice that of the nearest reference (and so that each multiplier may be implemented by a small-footprint shift arrangement that prepends a '0' bit in the least significant bit position of the incoming reference value to generate an output reference value). Other multiplication factors may be applied by the multipliers 293, 295, 297 in alternative embodiments, including non-uniform multiplication factors (e.g., applying $M_1$, $M_2$ and $M_3$, where $M_1 \neq M_2$ and/or $M_2 \neq M_3$). More generally, any number of reference voltages may be generated with any practicable voltage distribution, including distributions that are determined adaptively or heuristically instead of according to predetermined formulae. In all such cases, the reference voltages may be supplied to an adjuster circuit 299 that calibrates and/or adapts the reference voltages according to their differences or other source of information indicating a deviation from desired thresholds. Also, base register 291 may be loaded with an updated value in a register programming operation, or incremented/decremented as part of a calibration loop or adaptive loop (e.g., receiving an increment/decrement signal from adjuster 299) to shift all the reference voltages up or down.

Figure 6B:
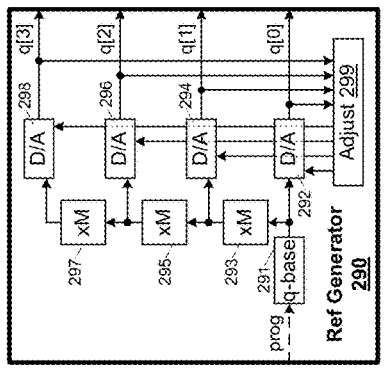
FIG. 6B illustrates an exemplary threshold profile that may be generated by the reference voltage generator of FIG. 6A or a variation thereof.
Figure 6C:
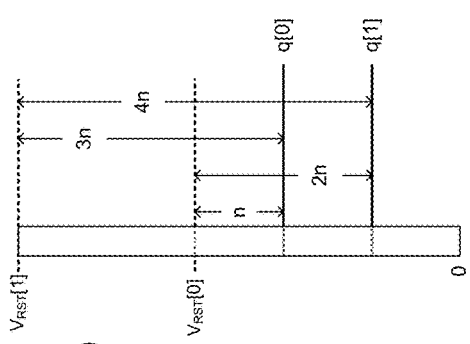
FIG. 6C illustrates an exemplary threshold profile that may be effected by applying reference voltages generated by the reference voltage generator of FIG. 6A (or a variation thereof) as pixel reset voltages.
Figure 6D:
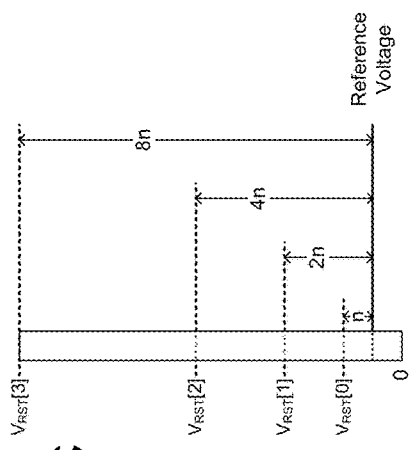
FIG. 6D illustrates an exemplary threshold profile effected by applying multiple pixel reset voltages in combination with multiple threshold voltages.

In one implementation, the digital-to-analog converters of FIG. 6A generate threshold voltages as respective offsets from a pixel reset (or precharge) voltage, thus yielding the threshold profile shown in FIG. 6B. In another embodiment, the reference voltages output from generator 290 are applied as pixel reset voltages instead of decision thresholds, thus enabling binary pixel sub-groups to be reset to respective voltages having different offsets from a threshold level. FIG. 6C illustrates an example of such an arrangement, with the outputs q[3:0] of the reference generator in FIG. 6A constituting binary pixel reset voltages $V_{RST}[3:0]$. As shown, the different reset voltages effect different binary pixel sampling thresholds without requiring multiple reference voltages to be delivered to the sense amplifier (i.e., the output of all binary pixels may be compared with a single reference voltage to yield a logic '1' or logic '0' binary pixel value). Though exponentially related threshold voltages and reset voltages are shown in FIGS. 6B and 6C, numerous other voltage step sizes (including adaptively or algorithmically determined step sizes as well as programmably controlled step sizes) may be applied in alternative embodiments. Also, the two approaches shown in FIGS. 6B and 6C (multi-thresholding through application of non-uniform threshold voltages and multi-thresholding through application of non-uniform pixel reset voltages) may be combined as shown in FIG. 6D. In the example shown, two different pixel reset voltages (VRST[1:0]) are applied in combination with two different reference voltages (q[1:0]) to achieve four distinct binary pixel thresholds. Though a linear threshold step (n, 2n, 3n, 4n) is shown in FIG. 6D, other threshold steps may be effected in alternative embodiments.

Figure 7:
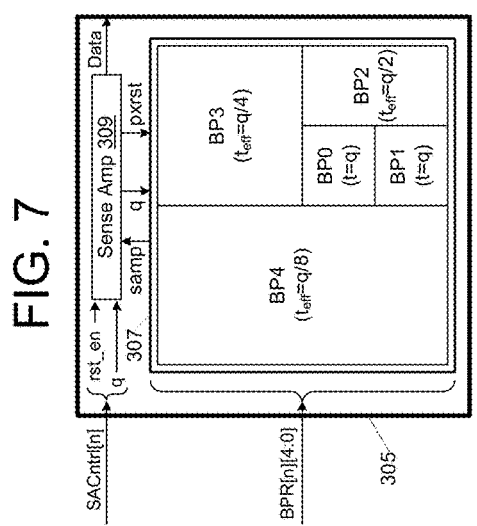
FIG. 7 illustrates an embodiment of a conditional-reset sense-amp super pixel having variably-sized binary pixels to effect a spatial-distribution of non-uniform thresholds without requiring multiple reference voltages.

FIG. 7 illustrates an embodiment of a conditional-reset SSP 305 having variably-sized (i.e., non-uniform) binary pixels 307 to effect a spatial-distribution of non-uniform thresholds without requiring multiple reference voltages. In the example shown, the SSP includes five binary pixels, including two "1×" binary pixels, BP0 and BP1, having sizes corresponding to singe binary pixel cells, a "2×" binary pixel (BP2) sized to occupy approximately twice the area of a 1× binary pixel, a 4× binary pixel (BP3) sized to occupy approximately four times the area of a 1× binary pixel and an 8× binary pixel (BP4) sized to occupy approximately eight times the area of a 1× binary pixel. In one embodiment, the 1× binary pixels and the 4× binary pixels have a square aspect, while the 2× and 8× binary pixels have an oblong aspect, thus enabling all the binary pixels to be disposed compactly within a square SSP footprint. Different size ratios and binary pixel aspect ratios may be used in alternative embodiments (e.g., each binary pixel may have an aspect ratio of $1/2^{1/2}$ so that when doubled along the shorter dimension to produce a larger binary pixel, the same aspect ratio is maintained), particularly where the SSP footprint is oblong or non-quadrilateral.

Regardless of the exact pixel size ratios and aspect ratios, all else being equal, larger binary pixels can have effectively lower thresholds (greater sensitivity) than smaller binary pixels when their outputs are compared with a consistent reference voltage. This is particularly true with extremely small pixel sizes (i.e., at sizes where the capacitance of the photodiode itself does not dominate the overall capacitance of the sensing node) as the larger of two such pixels receives on average proportionally more photoelectrons, and therefore exhibits a faster decline in detection node voltage (on average), than the smaller of two such pixels for the same incoming photon flux. Accordingly, the effective threshold, "$t_{eff}$" for the 2×, 4× and 8× binary pixels can approach ½, ¼ and ⅛ that of the 1× binary pixel for the same reference voltage, 'q' and thus are shown as 'q/2', 'q/4' and 'q/8', respectively. In devices where the photodiode capacitance is non-negligible, a less pronounced difference will be observed—the differences can be characterized for a specific implementation and expressed as a set of thresholds.

Figure 13:
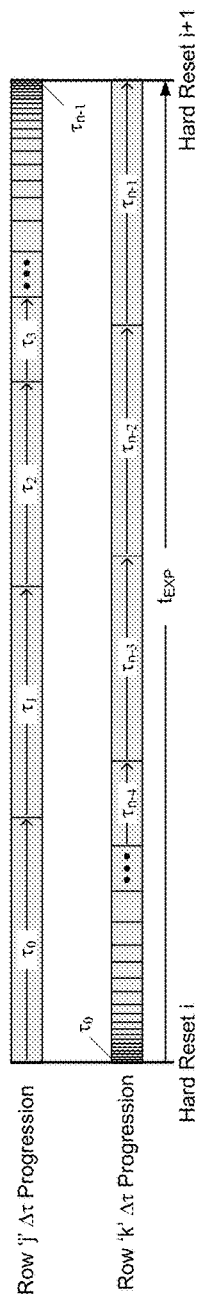
FIG. 13 illustrates exemplary non-uniform sampling interval progressions that may be employed to balance the pixel sampling workload through an exposure interval.

Still referring to FIG. 7, the SSP receives binary pixel row signals and sense amp control signals generally as described in reference to FIG. 13 (including a single reference voltage ('q') and a reset-enable signal ("rst_en") to time the variable temporal oversampling operation described above), except that the number of binary pixel row signals is reduced to account for the reduced number of binary pixels per unit area (i.e., a logarithmically reduced number of binary pixels in the embodiment shown). The reference voltage, q, is applied to all of the binary pixels, thus obviating the distribution and selection of multiple reference voltages. In one embodiment, the same binary pixel layout is applied in all SSPs. In alternative embodiments, the sizes and/or relative positioning of differently-sized binary pixels may be altered from ASP to ASP (e.g., mirrored across an axis). Also, though a single-reference voltage embodiment is shown, multiple reference voltages may be used in combination with non-uniform binary pixel sizes to effect multi-thresholding in other embodiments. For example, two reference voltages can be applied in combination with two sizes of binary pixels to achieve four effective thresholds within a given SSP.

Figure 8:
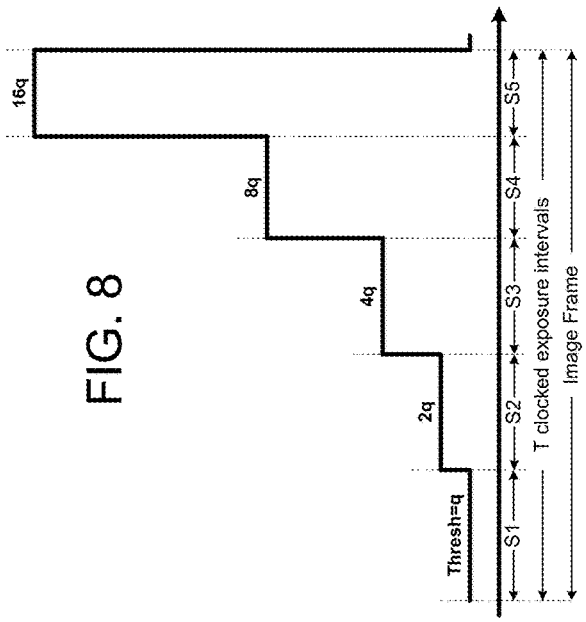
FIG. 8 illustrates an exemplary sequential application of different reference voltages to the binary pixels of an image sensor to effect a temporal rather than a spatial distribution of different sampling thresholds.

FIG. 8 illustrates an exemplary sequential application of different reference voltages to the binary pixels of an image sensor to effect a temporal rather than a spatial distribution of thresholds. In the example shown, the T clocked exposure intervals (each corresponding to a read-out of the image sensor) that constitute an image frame period are divided into a number of sub-frame intervals (five in the example shown), each associated with a respective sampling threshold. Thus, a single threshold 'q' is applied in sense/read-out operations executed within all binary pixels within the image sensor for the exposure intervals that constitute a first sub-frame interval, S1. At the conclusion of S1, the threshold is adjusted (e.g., doubled in this example) and again applied in sensor-wide binary pixel sense/read-out operations for the exposure intervals that constitute a second sub-frame interval, S2. This threshold-adjust and sensor read-out approach is repeated for each of the remaining sub-frame intervals, until the conclusion of the image frame interval is reached (i.e., image sample count=T). In alternative embodiments the threshold voltage may be stepped between more, fewer and/or different threshold levels than those shown, and the threshold steps may progress downward instead of upward or even be non-monotonic. Also, the number of image samples acquired for respective thresholds may be non-uniform (i.e., capturing more image samples at one threshold than another). Further, all such parameters (threshold value applied in each sub-frame interval, number of image samples per sub-frame interval, number of threshold steps per image frame) may be varied dynamically according to ambient conditions or other considerations (e.g., power mode, image resolution, ISO, etc.). The temporally adjusted thresholds may be employed in combination with either or both of the spatially-distributed threshold approaches described above (i.e., different reference voltages applied in connection with respective sub-groups of binary pixels and/or variably-sized binary pixels). Moreover, in all such cases, conditional reset may be employed so that a given binary pixel is reset only if its binary pixel value exceeds the threshold applied in the sampling interval.

Figure 9:
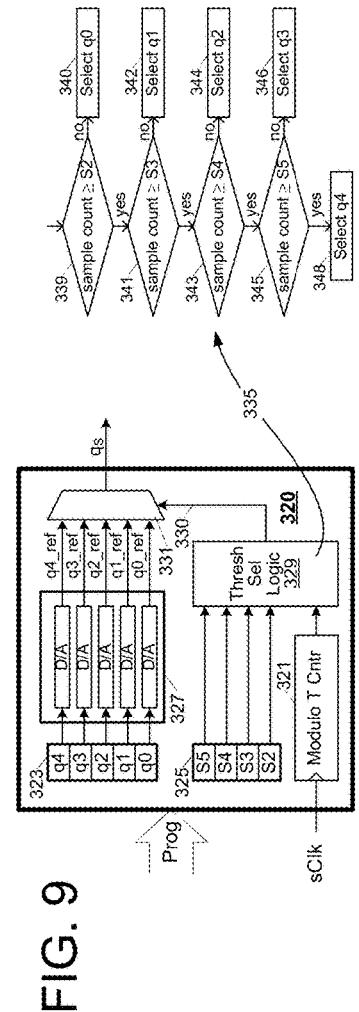
FIG. 9 illustrates an embodiment of a threshold generator that may be used to generate sequentially adjusted sampling thresholds as described in reference to FIG. 8.

FIG. 9 illustrates an embodiment of a threshold generator 320 that may be used to generate sequentially adjusted sampling thresholds as described in reference to FIG. 8. In one embodiment, threshold generator 320 is included within the row control logic of an image sensor IC (e.g., logic 155 of FIG. 1) and outputs a sequence of reference voltages as part of the sense-amp control signals supplied to the SSPs of the image sensor. In alternative embodiments, the threshold generator may be disposed elsewhere within an image sensor IC, or even partly or completely off-chip (e.g., in a host processor that outputs a sequence of digital reference values to be converted to analog form within the image sensor IC and applied in binary pixel sense/read-out operations).

In the embodiment shown, reference generator 320 includes a modulo T counter 321, threshold select logic 329, sub-frame-interval register 325, threshold register 323, D/A converter bank 327 and selector circuit 331. Subframe-interval register 325 includes storage fields to store sub-frame count values above which a corresponding one of the thresholds programmed within threshold register 323 is to be applied. In the implementation shown, for example, sub-frame-interval register 325 includes four storage fields that define the durations (in clocked exposure intervals) of the final four sub-frame intervals within the image frame period, with the first sub-frame interval (i.e., S1) being implied by the S2 sub-frame count value. More or fewer sub-frame intervals than the five shown may be supported in alternative embodiments.

Still referring to FIG. 9, modulo-T counter 321 counts transitions of a clock signal, Clk, counting up from zero to T−1 before overflowing to zero (or down from T−1 to zero before underflowing to T−1). The counter output, which represents a count of the sensor read-out being performed (i.e., the '$i^{th}$' one of the T image samples to be acquired within the image frame period) and thus a sample count, is supplied together with the sub-frame count values from register 325 to threshold select logic 329. Threshold select logic 329 compares the sample count to the sub-frame count values to produce a threshold-select value 330 corresponding to the sub-frame count range in which the sample count falls. That is, as shown in conceptual view 335, if the sample count is less than the S2 sub-frame count value (negative determination at 339), threshold select logic 329 outputs a threshold-select value to selector circuit 331 to select the q0 reference voltage (i.e., voltage level generated by D/A converter bank 327 in response to the q0 value programmed within threshold register 323) to be output as the sub-frame threshold, 'qs' (340). After the sample count reaches the S2 sub-frame count (affirmative determination at 339) the threshold select logic outputs a threshold-select value to select the q1 reference voltage at 342 and continues to do so until the sample count reaches the S3 sub-frame count (affirmative determination at 341). Upon reaching the S3 sub-frame count, the threshold select logic outputs a threshold-select value to select the q2 reference voltage at 344 and continues to do so until the sample count reaches the S4 sub-frame count (affirmative determination at 343). Similarly, upon reaching the S4 sub-frame count, the threshold select logic outputs a threshold-select value to select the q3 reference voltage at 346 and continues to do so until the sample count reaches the S5 sub-frame count (affirmative determination at 345), after which the threshold select logic outputs a threshold-select value to select the q4 reference voltage at 348.

The threshold generator of FIG. 9 may be varied in numerous ways in alternative embodiments. For example the D/A converters may be omitted and the threshold values instead output as set of digital signals (e.g., an N-bit signal that can be used within recipient sense amplifiers to adjust a digitally-controlled reference). Also, a single "base" threshold value may be programmed within a threshold control register and applied within other circuitry to derive the remaining thresholds (or all of the thresholds) as in the embodiment of FIG. 6A. Similarly, a single sub-frame count value (or smaller number of sub-frame count values) may be programmed and used to derive the remaining sub-frame count values. More generally, any circuitry capable of outputting different thresholds for different sub-frame intervals within an image frame interval may be used in alternative embodiments.

Numerous techniques may be applied to calibrate thresholds in a multi-threshold binary pixel image sensor including, for example and without limitation, image-data-dependent calibration techniques as well as precision reference comparison. In all cases, calibration operations may be executed by logic on the image sensor die and/or on an IC coupled to the image sensor IC. Calibration operations may be carried out at regular intervals, opportunistically (e.g., when an idle state is detected or another maintenance operation is being performed) or in response to events such as threshold divergence detection, user input, etc. Also, in some embodiments, the calibration techniques may be used not only to adjust the sensor thresholds, but also (or alternatively) to detect the ratios of the observed thresholds and adjust the image reconstruction algorithms to reconstruct relative luminance based on the observed thresholds from the instant the image was gathered.

Reconstruction of a multilevel-per-pixel image from a variable-temporal oversampled—and potentially multi-thresholded—binary pixel array is somewhat different than for a single-threshold and/or uniformly temporally oversampled pixel array. For a single-threshold array, each ASP can return a value ACC(i,j) for the number of binary '1' pixel outputs observed spatially and temporally within that ASP for an image frame. ACC(i,j) can be accumulated on-chip, partially on-chip and partially off-chip, or completely off-chip, e.g., using the methods described above for resetting the binary pixel array. Once the accumulation is made, however, the device completing the accumulation can either convert the accumulation to a relative luminance value or pass the raw accumulation downstream to a storage or processing device for downstream conversion.

The relative luminance value estimated for a conditionally-reset binary pixel ASP is, in one embodiment, the maximum likelihood relative luminance mapping to ACC(i, j). Due primarily to photon shot noise and quantization noise bias (there is a non-zero likelihood that a binary pixel will exceed the current threshold by more than one photoelectron between sample times), a range of luminance can produce each possible value of ACC(i,j). The maximum likelihood relative luminance is the luminance value that is most probable given ACC(i,j). The values can be derived from an equation and stored in a lookup table or evaluated directly by a processor, derived via simulation and stored in a lookup table, or derived via controlled measurements and stored in a lookup table. A lookup table can be stored in on- or off-chip nonvolatile memory, transferred from such memory to an on- or off-chip volatile memory for use, or created directly by a host processor for a given current thresholds/samples setting set.

A variety of approaches exist when the conditionally-reset binary pixel ASP is operated in a multi-threshold mode. In one approach, a value ACC(i,j) is returned for each ASP as in the single-threshold case, and evaluated by an equation or input to a lookup table as in the case above. The equation/lookup table result depends on the actual thresholds used and the number of sample points available per ASP at each sample point. When the equation or lookup table inaccurately models these factors, reconstruction errors will result. The calibration methods described above can reduce such errors in an appropriate embodiment.

Although a direct estimate from a multi-threshold joint-accumulated ASP is possible, such an estimate is generally sub-optimal. Optimality is not achieved because not all accumulated samples have the same probability density function (PDF)—intuitively, a threshold that is exceeded at almost every observation point has a much larger uncertainty than one that is exceeded at roughly every third observation point. Thus a better estimate can be obtained if it is possible for the binary sensor to return, for each ASP, separate accumulations $ACC(q_n)(i,j)$ for each threshold $q_n$. A relative luminance maximum likelihood function can then be evaluated from the joint probability density function of all $ACC(q_n)(i,j)$, considered together. In one embodiment, the joint PDF is stored as a multidimensional lookup table, from which relative luminance is interpolated. In another embodiment, the PDFs are assumed independent and are represented separately for each threshold $q_n$. The individual PDFs are then jointly evaluated to produce an estimate.

Figure 10A:
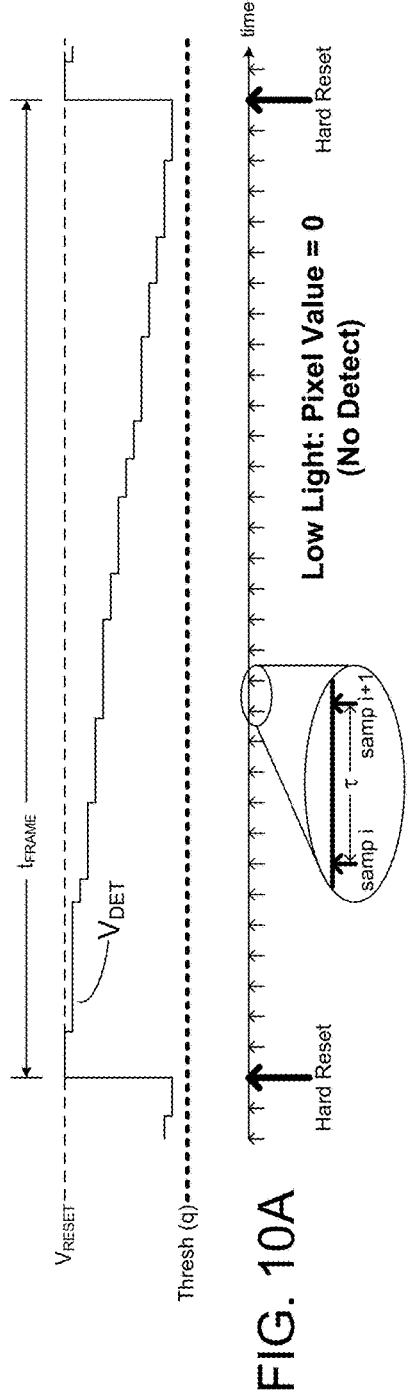
FIGS. 10A and 10B illustrate operation of a conditional-reset binary pixel sensor in low-light and high-light conditions.
Figure 10B:
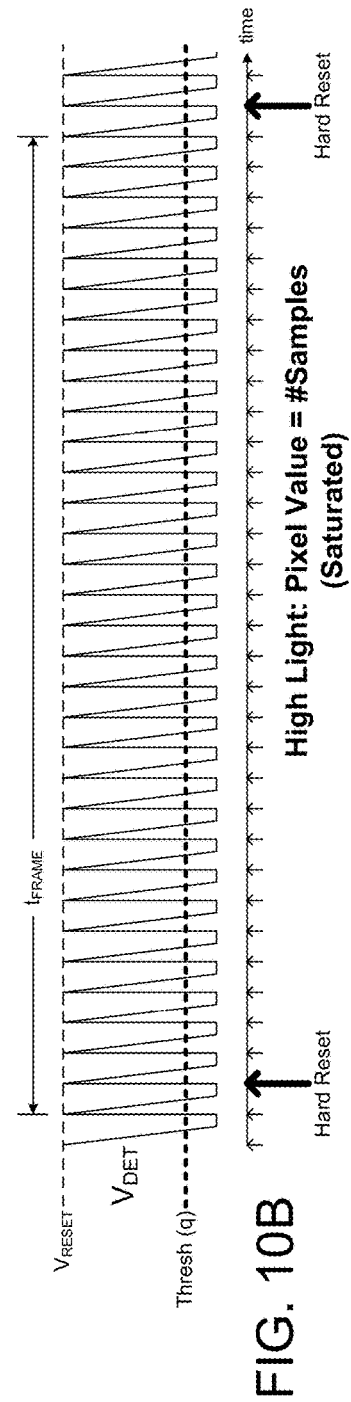

FIGS. 10A and 10B illustrate operation of a conditional-reset binary pixel sensor in low-light and high-light conditions, respectively. In the low-light case (FIG. 10A), the total number of photon strikes over the duration of the exposure interval (or frame interval, $t_{FRAME}$) is insufficient to exceed the binary detection threshold (q) so that a pixel value of zero (no detection) results. In a number of embodiments, the pixel control logic may detect this zero-detect condition and responsively adjust the detection threshold (e.g., iteratively reducing the number of photon strikes required to yield a '1'), thus adaptively increasing low-light sensitivity.

In FIG. 10B, the high luminance fills the photodiode well (i.e., binary pixel saturates) during every sampling interval, thus yielding a logic '1' sample (and triggering a reset) for each of the N samples. That is, the high light intensity has exceeded the dynamic range of the pixel (i.e., with the response curve flat-lining at the maximum sample value) such that further increase in intensity (or even decrease down to the point at which at least one logic '0' is detected) is undetected.

FIG. 11 illustrates an approach for extending the dynamic range of a conditional-reset binary pixel. As shown, instead of sampling the binary pixel at uniform intervals throughout the frame period, the frame period is divided into a number of non-uniform sampling intervals in which the longest sampling interval ($\tau_{max}$) is longer than a sampling interval in the uniform case ($\tau_{fix}$) and the shortest sampling interval ($\tau_{min}$) is shorter than the uniform sampling interval. In one embodiment, for example, a logarithmic progression of sampling intervals from longest to shortest (or vice-versa, though non-monotonic progressions may also be used) is applied, with the sum of $n_t$ sampling intervals totaling to the frame period (i.e., $t_{exp}$ or $t_{FRAME}$) and the sampling interval durations defined as follows:

$$\frac{\tau_i}{\tau_{min}} = \text{round}\left[2^{\frac{i-1}{n_t-1}\log_2\left(\frac{\tau_{max}}{\tau_{min}}\right)}\right],$$

where $t_i$ is the duration of the $i^{th}$ sampling interval (i ranging from 0 to $n_t$−1). Other interval-duration progressions may be used in alternative embodiments, including linear progressions, heuristically determined progressions, user-specified patterns, etc.

As shown in FIG. 11, the shortened sampling intervals permit detection of non-activated binary pixels (i.e., sampling a logic '0') even in the high-light condition that saturated the uniform-progression binary pixel sensor. That is, by shortening the time between a subset of the samples within the frame period, it becomes possible to distinguish between intensity variations even at extremely high-light conditions, thus extending the dynamic range of the sensor. More generally varying the duration of the temporal sampling periods may enable the same dynamic range to be achieved as in the uniform sampling-period case in fewer total samples (i.e., same dynamic range at reduced bit depth) and thus with reduced power consumption. Alternatively (or additionally), varying the duration of the temporal sampling periods may enable improved dynamic range and signal-to-noise ratio with only one or a few binary thresholds, thus simplifying sensor implementation.

FIG. 12A illustrates an embodiment of sensor control logic 420 that may be used to implement control logic 153 of FIG. 3 in a binary pixel image sensor having non-uniform sampling intervals. As shown, a configuration register 421 may be programmed with parameters including, for example and without limitation, frame period ($\tau_{exp}$), maximum sampling interval duration ($\tau_{max}$), minimum sampling interval duration ($\tau_{min}$), number of samples ($n_t$), progression policy (e.g., linear, logarithmic, heuristic, prescribed pattern, etc.) and so forth. The contents of the programmable register form a tuple (i.e., a composite value) that is applied to lookup table 423 to select an entry containing a set of sampling intervals and their respective numbers of occurrences within each frame period. A finite state machine 425 steps through (i.e., selects in turn) each sampling interval ($\tau$)/occurrence-count (Q) pair within the selected table entry to generate row control/timing signals and read-out control/timing signals that correspond to the various sampling intervals and their corresponding numbers of occurrences.

FIG. 12B illustrates an exemplary flow of the finite state machine 425 (FSM) of FIG. 12A. Starting at 427, the variable sampling interval ($\tau$) and occurrence count (Q) are initialized to a first interval/occurrence pair ($\tau_1$, $Q_1$) obtained from the interval lookup table (i.e., element 423 of FIG. 24A), and an occurrence index, i and interval index j are set to initial values (i.e., i=1, j=1). At 428, the FSM allows light to be accumulated within the binary pixel array for duration $\tau$, followed by either a destructive-sampling operation with a hard reset, or a non-destructive sampling operation with a conditional reset. The occurrence index is incremented at 429 and then compared with the occurrence count (Q) at 430. If the occurrence index does not exceed the occurrence count (i.e., negative determination at 430), the light accumulation operation at 428 is repeated to acquire another sample following light accumulation at the same sampling interval. After the final occurrence of a given sampling interval (i.e., affirmative determination at 430), the interval index T is incremented at 431 and compared with the maximum index (i.e., $n_t$, the total number of sampling intervals per exposure interval) at 432. If the interval index does not exceed the maximum index, then the occurrence index is reset and a new sampling interval and occurrence count ($t_j$, $Q_j$) are assigned as the sampling interval and occurrence count for the next iteration of the operations at 428-430. If the interval index exceeds the maximum index, then the exposure interval is deemed to be complete.

Depending on light level, a quality setting, or some other parameter, it may be desirable to adjust the shortest sampling intervals to a duration that makes it impossible to sample all rows in the array at that duration during a single pass. In such a case, different parts of the array can be sequenced differently to accommodate the shortest sampling. For instance, some of the rows of the array can be in a long-duration sample interval while others are in shorter-duration sampling intervals, with the overall scheduling adjusted to not exceed the sample rate limitations of the pixel readout (or device readout) circuitry. One example of such non-uniform sampling interval progressions is presented in FIG. 13. As shown, the sampling interval progressively shortens for row 'j' (e.g., following a logarithmic, linear, or other progression), and progressively lengthens for row 'k', thereby balancing the pixel sampling workload during the exposure interval shown ($t_{exp}$). While symmetric progressions are shown (i.e., the $\Delta\tau$ progression in row 'k' is the mirror image of the At progression in row 'j'), numerous other progression interval variations may be employed in alternative embodiments.

Figure 14:
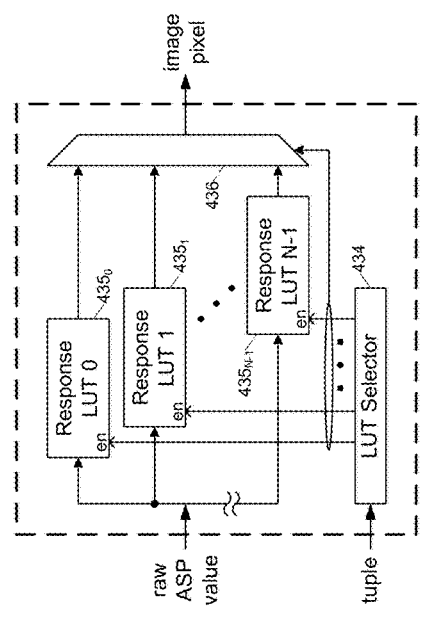
FIG. 14 illustrates an exemplary image reconstruction circuit (e.g., implemented on chip with the binary pixel image sensor or in a separate IC die) that may be used to generate image pixels in response to raw algorithmic super pixel (ASP) values obtained from binary pixels sampled with non-uniform sampling intervals.

FIG. 14 illustrates an exemplary image reconstruction circuit (e.g., implemented on chip with the binary pixel image sensor or in a separate IC die) that may be used to generate image pixels in response to raw ASP values obtained from binary pixels sampled with non-uniform sampling intervals. In the particular embodiment shown, a set of lookup tables $435_0$-$435_{N-1}$ each corresponding to a response curve (e.g., as shown in FIG. 31) for a given pattern of non-uniform sampling intervals, thresholds and other parameters expressed by an incoming selector value, "tuple." As shown, the selector value is supplied to a LUT selector 434 which asserts one of N enable signals (i.e., according to the value of the LUT selector) to enable one of the LUTs $435_0$-$435_{N-1}$ to respond to the incoming "raw" ASP value by outputting an image pixel value corresponding to the point on the LUT-curve indexed by the ASP value. The enable signals are also supplied to a multiplexer 436 (or other selector circuit) to pass the image pixel output from the enabled LUT to downstream logic or I/O circuitry.

Reflecting on the various embodiments of integrated-circuit image sensors disclosed herein, it should be noted that the integrated-circuit image sensors may, in all cases, be implemented on a single die or by multiple dies (e.g., in a die-stack and/or side-by-side arrangement as in a system-on-chip, system-in-package, multi-die package, multi-chip module, package-on-package, package-in-package, and so forth). For example, some or all of the various logic functions (e.g., look-up tables, counter circuits, buffer circuits, etc.) may be implemented on a different die than the die bearing light-sensitive pixels, with the different dies being wire-bonded, cabled, interconnected by TSVs or otherwise coupled to one another to form the final integrated-circuit image sensor.

Figure 15B:
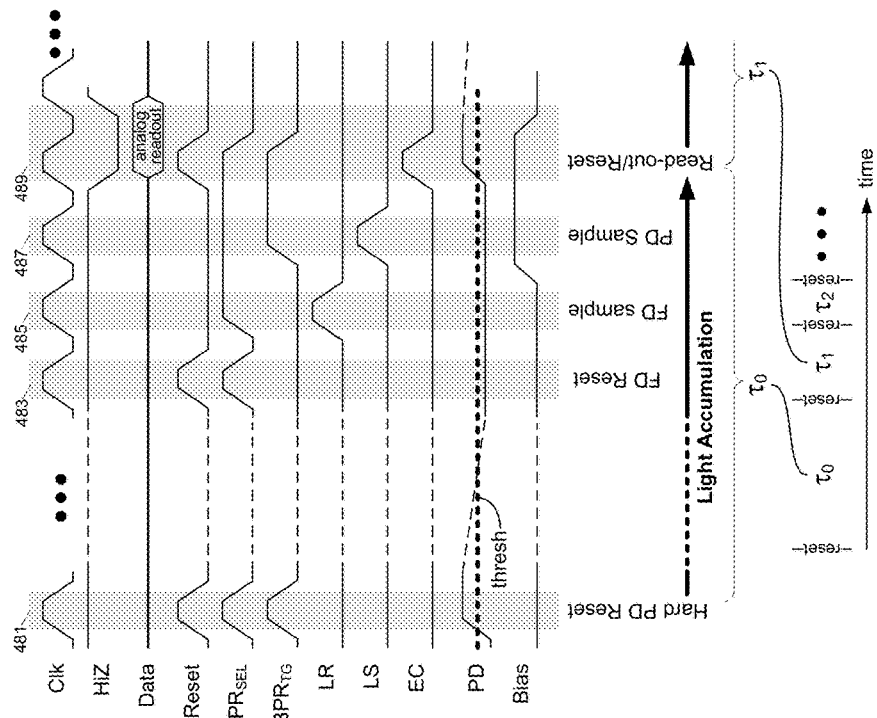
FIG. 15B is a timing diagram illustrating an exemplary operation of a sense-amp super pixel that includes the conditional-reset sense amplifier and binary pixel of FIG. 15A.
Figure 15A:
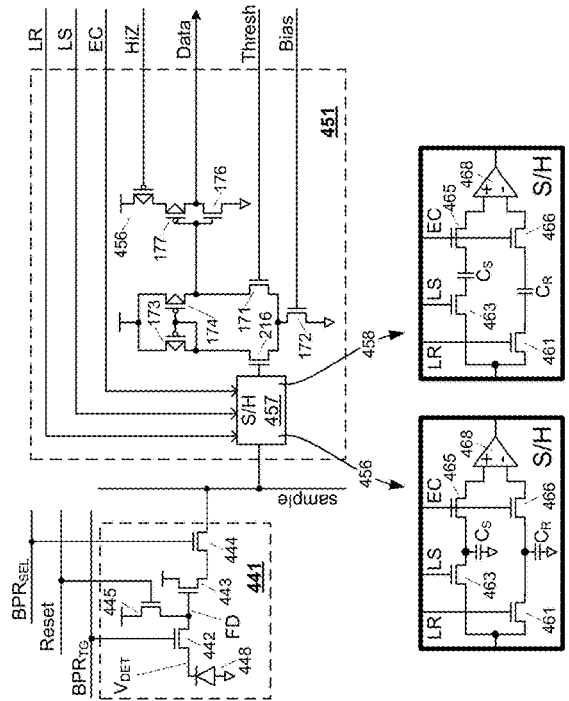
FIG. 15A illustrates an alternative embodiment of a conditional-reset sense amplifier together with a binary pixel that permits correlated double-sampling.

FIGS. 15A and 15B show an embodiment of a circuit and exemplary operation of a pixel 441 and a sense amplifier 451 as an example of an embodiment using a 4T-pixel with correlated double sampling (CDS). To support CDS operation, pixel 441 has a floating diffusion (shown at node "FD" and sense amplifier 151 includes a sample-and-hold circuit 457 (shown in alternative exemplary implementations at 456 and 458). To reset pixel 441, an operation shown at 481 of FIG. 15B, signals Reset and $BPR_{TG}$ are asserted concurrently, switching on transistors 442 and 445 to charge photodiode 448. After a light accumulation interval 482, Reset and $BPR_{SEL}$ are asserted while $BPR_{TG}$ is not asserted. This operation, which is shown at 483 of FIG. 15B, opens transistors 443 and 444 to reset the floating diffusion. At 485 of FIG. 15B, signal LR is asserted to switch on transistor 461 within sample-and-hold circuit 457, thereby enabling the charge level at node FD (i.e., floating diffusion reset charge) to be stored in capacitive element CR. Thereafter, at 487 of FIG. 15B, signal $BPR_{SEL}$ is asserted together with $BPR_{TG}$. $BPR_{TG}$ moves the charge from the photodiode onto node FD. Concurrent assertion of signal LS switches on transistor 463 within sample-and-hold circuit 457, thereby enabling storage a voltage representative of the photodiode charge level within capacitive element CS. Lastly, at the start of read-out/reset interval 489 (FIG. 15B), signal EC is asserted switch on transistors 465 and 466 of sample-and-hold circuit 457, delivering the reset charge on CR and the photodiode charge on CS to respective inputs of a differential amplifier 468 and thus enabling the difference between the reset charge and photodiode charge to be sensed in the sense-amplifier 451 (i.e., applied to the gate of transistor 216 for differential sensing with respect to the threshold applied to the gate of transistor 171). After read-out/reset is completed, signal HiZ may be raised as shown at the tail end of interval 489 to switch inverter-enable transistor 456 to a non-conducting state, thereby powering off the inverter formed by transistors 176 and 177 and rendering the sense amplifier output (i.e., "Data" output of inverter formed by transistors 176, 177) to a high impedance state.

FIG. 16 illustrates an alternative embodiment of a binary pixel image sensor 501 having a shared-counter architecture. In the implementation shown, image pixels (which are assumed for present purposes to be coextensive with algorithmic super pixels) are organized in "pixel mats" 521, with each pixel mat formed by a group of image pixels that share a respective counter 523. Counters 523 (which may be viewed as a distributed implementation of the accumulator logic 157 of FIG. 1) serve to count pixel values obtained by sampling operations within the corresponding pixel mats, with count values corresponding to respective image pixels being provided to PHY 509 for output to an external memory 503. Although each counter 523 in the sensor/counter array 507 is depicted as being coupled to the PHY via a respective bit line 525, counters may share bit lines (e.g., all or some subset of counters within a given column may share a bit line).

Still referring to FIG. 16, sequencing logic 511 is provided to control sampling operations within rows of image pixels and counting operations within the counters for respective image pixel mats. Control logic 515 is provided to generate control and timing signals applied within the sequencing logic and PHY during image capture operations. In one embodiment, for example, control logic 515 outputs a sampling clock signal and transmit clock signal to the sequencing logic and PHY, respectively, with each clock signal establishing a separate clock domain within image sensor IC 501. As discussed below, this arrangement enables a relatively steady data flow (in the transmit clock domain) from image sensor IC 501 to memory IC 503, despite a potentially more bursty internal data transfer (in the sampling clock domain) from the pixel mat counters to the PHY.

Referring to detail view 530, each image pixel mat is assumed to include four image pixels (IP1-IP4), with each image pixel including a set of four binary pixels (i.e., image pixel IP1 includes binary pixels 1,1; 1,2; 1,3 and 1,4). Accordingly, each image pixel value has a spatial oversampling factor (s) of 4, with the individual binary pixel samples being accumulated within the corresponding pixel mat counter 523 before being forwarded to PHY 509. Image pixels may also be temporally oversampled as discussed above, with the results of iteratively executed spatial oversampling sequences being combined to form an s*n oversampled image pixel value, where '*' denotes multiplication and 'n' is the iteration count and thus the temporal oversampling factor.

FIG. 17 illustrates a spatial/temporal oversampling sequence with respect to image pixel 1 (IP1) of the image pixel mat shown in detail view 530 of FIG. 16. As shown, each of the binary pixels, $BP_{i,j}$, within IP1 is sampled in succession in a first spatial oversampling sequence to yield sample values tallied (or accumulated or counted) within the corresponding pixel mat counter. This spatial-oversampling sequence (i.e., sampling all the binary pixels of an image pixel and tallying the sample values in a pixel mat counter) is represented symbolically by symbol 540. In the example shown, a second IP1 spatial oversampling sequence follows immediately after the first (i.e., no other image pixels in the same mat are sampled between the two IP1 spatial-oversampling sequences) to effect 2× temporal oversampling (i.e., n=2). Generalizing the spatial oversampling factor and temporal oversampling factor as ranging from 1 to s and 1 to n, respectively ('s' and 'n' representing maximum practicable limits), then the count value accumulated at the conclusion of any n successive spatial oversampling sequences, may have any value from 0 to s*n, a range bearing on the size of the pixel mat counter (like the pixels themselves, however, the pixel mat counter may be sized to saturate, in the case of the counter at a count value lower than s*n).

To enable a counter to be shared among the constituent pixels of a mat, a count value accumulated for a given image pixel (i.e., after one or more successive spatial-oversampling sequences) is transferred to memory (e.g., memory IC 503 of FIG. 16) and the counter is reset prior to accumulating a count value for another image pixel (in an alternate embodiment, the counters can be allowed to "wrap" without reset, with a known counter usage sequence being used to calculate differential counts between counter samplings). FIG. 18 illustrates this count transfer/reset operation, with the output of the pixel mat counter being transferred to memory and the counter reset after each n successive spatial-oversampling sequences with respect to a given image pixel (i.e., sequences in which no other image pixel within the same mat is sampled). In an implementation in which n*s constitutes the total number of image pixel samples acquired during a given exposure interval, the image-pixel sequencing operation shown in FIG. 18 establishes a minimum uniform interval between each of the samples of a given binary pixel, a time corresponding to the spatial oversampling factor, s, times the minimum time between any two pixel sampling operations, $t_{min}$ (i.e., the $BP_{i,j}$ sampling interval as shown in FIG. 17).

In an implementation that repeats the FIG. 18 sampling sequence multiple ('r') times in each exposure interval, several interesting characteristics arise. First, the sampling interval with respect to a given binary pixel (or image pixel as a whole) becomes non-uniform, as the $s*t_{min}$ interval between successive samples of the same binary pixel during an uninterrupted image-pixel sampling sequence is followed by a much longer $s*n*(m-1)*t_{min}$ interval ('m' being the number of image pixels per pixel mat) between the final and initial pixel samples in successive iterations of the overarching sampling loop. Additionally, instead of forming the total value of a finalized image pixel to be applied in an image reconstruction operation, the value output from a given pixel mat counter following each uninterrupted image-pixel sampling sequence is but one of 'r' such values that collectively form the total value of the image pixel samples. In effect, each image pixel sample-counting operation (i.e., counting samples during an uninterrupted image-pixel sampling sequence) yields a partial accumulation of a larger total value. As discussed below, in a number of embodiments such partial results are stored individually in memory and then, during a subsequent reconstruction operation, retrieved and combined with one another (e.g., added) to form the finalized image pixel value. Comparing a uniform-interval sampling sequence (e.g., effected by executing s*n*r samples of each image pixel of a given pixel mat in uninterrupted succession) with a non-uniform sampling sequence in which a group of s*n samples is acquired for each image pixel one after another in each of 'r' loops through the pixel mat, a number of benefits of the latter approach become evident. First, because the maximum count achieved for a given image pixel is limited to the number of samples acquired in one loop through the sampling pattern, the size of the pixel mat counter may be reduced by a factor of $\log_2(r)$ relative to the uniform-interval approach (i.e., assuming the same total number of samples in either approach)—a substantial reduction in counter circuit area when a significant temporal oversampling factor (n*r) is employed. Additionally, as discussed above, mixing longer and shorter sampling intervals within the same exposure time may extend the effective dynamic range of the image sensor. More specifically, given that the total number of sampling operations that may be performed during a given exposure interval is constrained by the number of pixels to be sampled and availability of shared counter/sense-amplifier resources, it follows that, by acquiring a modest number of highest-resolution samples (i.e., "fine samples") of a given image pixel during a fraction of the exposure interval and acquiring less frequent samples ("coarse samples") for the remainder of the exposure interval, time and shared resources are freed to yield a potentially higher effective sampling resolution than possible in a uniform-interval scheme.

FIG. 19 illustrates an exemplary pixel sampling sequence in which each image pixel within a pixel mat is sampled with three different sampling intervals over the course of an exposure time, including a number of fine sampling intervals (i.e., shortest time interval or highest resolution) and progressively extended first and second coarse sampling intervals. More specifically, referring to image pixel IP1, four spatial-oversampling sequences are executed in succession following respective fine sampling intervals, with the net result being accumulated within the pixel mat counter and output from the counter following the fourth spatial-oversampling sequence (i.e., as indicated by transfer arrow 550). The ensuing six spatial-oversampling sequences are directed to other image pixels within the same pixel mat before image pixel IP1 is spatially oversampled again to yield a first coarse sample. Through this interleaved pixel sampling arrangement, a coarse sampling interval seven times the fine sampling interval is achieved with respect to IP1 (i.e., "Coarse 1"), while at the same time freeing resources to finely and coarsely sample other image pixels within the same pixel mat. After the first coarse sample is output from the pixel mat counter, the counter is freed to accumulate coarse and fine sample counts for image pixels for an even longer second coarse sampling interval ("Coarse 2"). Altogether, over an interval long enough to permit 24 spatial-oversampling sequences within the pixel mat, six spatial over-sampling sequences are applied to each of the image pixels, including four in succession to the same image pixel (establishing the fine sampling intervals) and two interleaved with sampling operations directed to other image pixels. Each transition in the image pixel selected for sampling is preceded by a sample-count transfer (and counter reset), so that a total of twelve sample-count transfers occurs over the course of the 24 spatial-oversampling sequences shown, thus yielding a relatively bursty sample transfer with respect to a given image pixel mat. That is the transfers are bunched in groups between fine-sampling sequences, thus consuming internal and external data transfer resources in bursts.

While the sequence shown in FIG. 19 may be executed iteratively to obtain the desired number of coarse and fine samples for each image pixel, the pattern shown may also be extended to include even longer coarse intervals, further freeing shared data transfer resources and thus enabling time-multiplexed application of those resources to different pixel mats. More specifically, by time-staggering the sample-sequencing of image pixel mats that share a common resource (e.g., internal bit line, external data link and/or associated circuitry) to align data transfer bursts from one pixel mat with a non-burst interval in another, a relatively steady data transfer profile may be obtained despite the bursty internal data transfer with respect to individual image pixels. FIG. 20 illustrates an exemplary sample sequencing that yields a levelized PHY output stream. As shown, sampling operations that yield bursty internal data transfer are staggered from image pixel to image pixel within a pixel mat (i.e., from image pixel IP1 to IP2 to IP3 within pixel mat row 1 ($M_1$)) and from pixel mat to pixel mat within a bit-line sharing column of pixel mats (i.e., from $M_1$ to $M_2$ to $M_J$). In the example shown, fine sampling operations are shifted progressively later within the exposure interval as the pixel mat row index increases, with the image pixels of the final pixel mat row ($M_J$) exhibiting a sampling profile that is substantially the reverse of that for the first pixel mat row ($M_1$). That is, whereas the image pixel sampling operations within the first row of pixel mats trends from fine to progressively more coarse sampling intervals, the sampling profile in the final row of pixel mats trends in the reverse direction from coarse to progressively finer sampling intervals. In alterative embodiments, other mat-to-mat changes in sampling progression are possible, including sampling progressions that are non-monotonic (i.e., not limited to increasing coarseness or decreasing coarseness) across all or most pixel mat rows.

Several variations on the basic sampling sequence can also be exploited. For longer overall frame times, the basic sequence can be lengthened by changing the pixel clock, or changing the number of clock edges between pixel samples. Alternately, the basic sequence can be repeated multiple times for a longer overall frame time (resulting in more data, but possible reducing image noise). Also, variations of the basic sequence (with different base duration) can be serially concatenated during a given frame.

FIG. 21 illustrates an exemplary storage of fractional image pixel count values within memory 503. In the example shown, the image count values are dispersed within one or more storage rows of the memory component (i.e., depicted as a single logical storage row 570 that could encompass multiple physical storage rows) according to their acquisition time within a given exposure interval. Thus, count values corresponding to groups of fine samples and individual coarse samples of image pixel $M_{1,1}IP_1$ (i.e., image pixel IP1 of pixel mat row 1, column 1) are stored at a sequence of ascending addresses that are increasingly spaced apart (i.e., according to the progressively longer time between samples), while count values corresponding to groups of fine samples and individual coarse samples of image pixel $M_{J,K}IP_4$ (i.e., image pixel IP4 of pixel mat row J, column K) are stored at a sequence of memory locations that draw increasingly closer together with ascending memory address. During image reconstruction, a reconstruction processor (which may be disposed on the same or different IC from the image sensor and/or memory) retrieves fractional count values stored at dispersed storage locations and sums or otherwise combines the fractional counts to produce a finalized image pixel sample. The image pixel sample itself may thereafter be revised through further image processing or used as an index (i.e., lookup value) to lookup another value representative of the light intensity field detected by the subject binary pixels (e.g., as discussed in reference to FIG. 14). In an embodiment where the counters are allowed to wrap and are not reset after a count value is read, the reconstruction processor retrieves two fractional count values and differences them before summing or combining to produce a finalized image pixel sample.

Figures 22, 23, 24, 25:
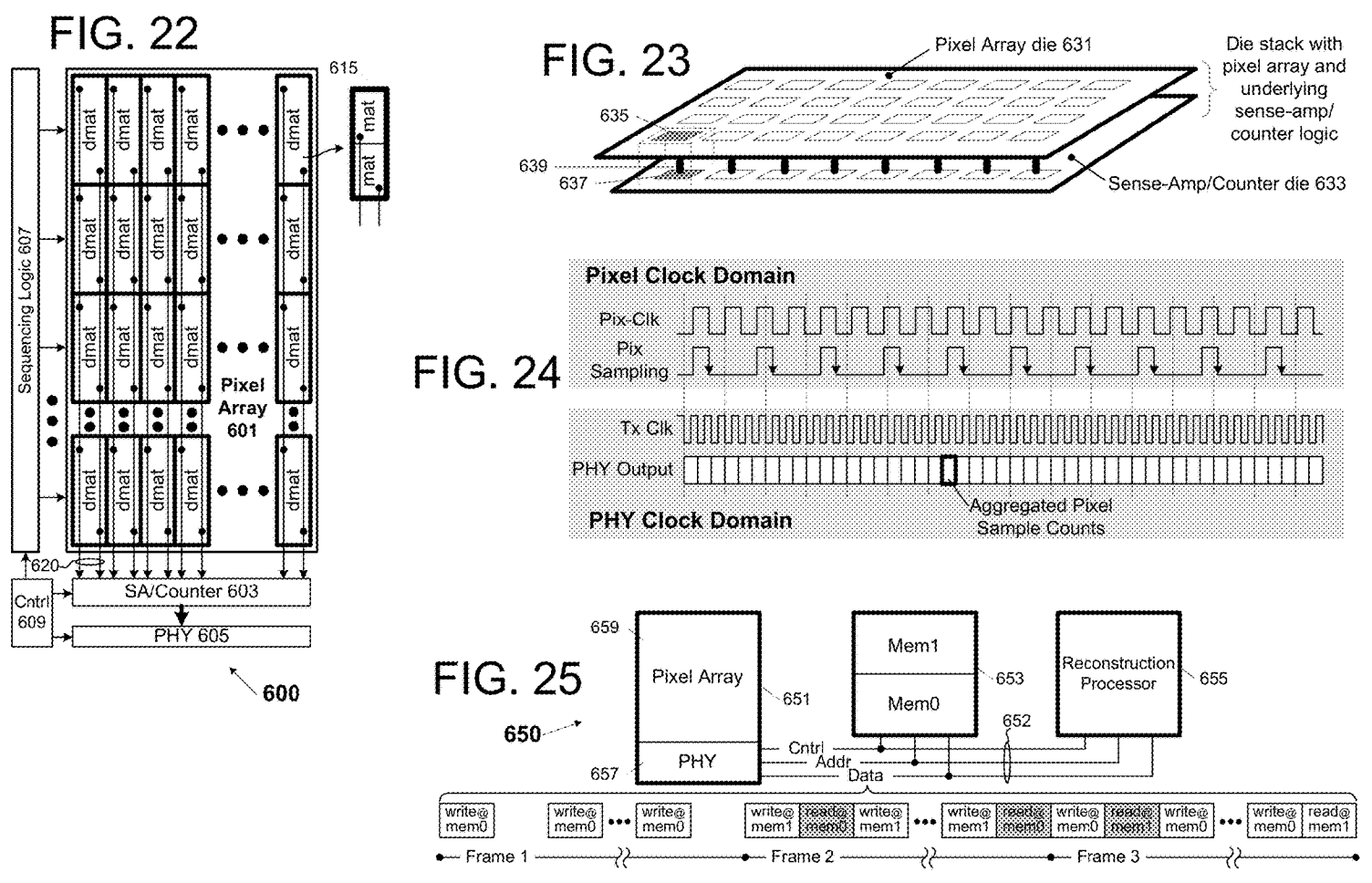

FIG. 22 illustrates an alternative image sensor architecture 600 in which two rows of image pixel mats are operated in parallel, with each pair of co-operated image pixel mats forming a "dmat" 615 (double mat). To avoid resource conflicts, separate bit lines 620 are coupled to the individual pixel mats of each dmat, thus doubling the total number of bit lines in the image sensor array. The return for the additional bits, is a halved number of control signals from sequencing logic 607 (i.e., as only one set of row control signals is required for each two rows of image pixel mats) and halved image scan time. In the architecture shown, sense amplifiers and/or counters 603 are disposed at the periphery of pixel array 601 adjacent PHY 605 (i.e., coupled to respective columns of dmats via bit lines and sequenced in response to signals from Control Logic 609) instead of being dispersed among the image pixels. In such an architecture, it may be possible to share a single pair of counters across an entire column of image pixels, in effect, establishing a single dmat per column of image pixels.

FIG. 23 illustrates a stacked-die implementation of an image sensor that may be used to implement the generalized image sensors of FIGS. 1, 16 and 22. As shown, a pixel array is implemented in a first IC die 631 (the "pixel array" die), while image pixel sense amplifiers and pixel mat counters are disposed on a second IC die, referred to herein as the "logic" die or sense-amp/counter die, beneath or otherwise in physical proximity to corresponding pixels of a pixel mat. Thus the constituent pixels of a pixel mat 635 are disposed in the pixel array die immediately above (or adjacent to) the logic die implementation of sense amplifier(s) for the constituent image pixels of the pixel mat and pixel mat counter (collectively 637). In one embodiment, the pixel array die is fabricated for backside illumination (i.e., ground, lapped or otherwise prepared in a manner that permits light detection through the body of the substrate), thus permitting metal layers, bond pads, vias and/or other interconnect structures to be sandwiched between dies 631 and 633 (i.e., fabricated on the side of the pixel array die facing the logic die). The die-to-die interconnects shown conceptually at 639 may be implemented by wire bonds, cables, through-silicon vias (TSVs), or any other practicable chip-to-chip interconnection structures.

FIG. 24 illustrates an example of the distinct pixel (sampling) clock and transmit clock domains described in reference to FIG. 1. As shown, the pixel clock ("Pix-Clk") oscillates at a frequency corresponding to the requisite pixel sampling rate within the image sensor (in this case, triggering a pixel sampling operation at every falling pixel-clock edge during a given image capture operation), while the transmit clock ("Tx Clk") oscillates at a frequency corresponding to the desired data transmission rate of the physical signaling interface (PHY). By this arrangement, pixel sampling rates may be scaled up or down according to application requirements (or selected operating modes) without changing the PHY signaling rate, thus enabling the image sensor to be operated using commodity memory components as the storage element for fractional pixel count values. In one embodiment, the pixel clock and transmit clock may be derived from (or instantiated by) a common clock source (generated on or off chip) and thus have different frequencies but a relatively stable phase relation. Alternatively, the pixel and transmit clocks may result from different clock sources that exhibit frequency and/or phase drift relative to one another. In either case, domain crossing logic may be provided between the accumulator logic and PHY (e.g., elements 107 and 109 of FIG. 1, elements 603 and 605 of FIG. 22, etc.) to effect image data transfer between the two clock domains, buffering data as necessary to accommodate skip points between pixel clock and transmit clock edges (i.e., buffer load and unload clock edges).

FIG. 25 illustrates an image system architecture 650 that may be used to implement the image sensor, image data storage and image reconstruction functions described in reference to FIG. 1. In the embodiment shown, a memory component 653 (which may be two or more memory components) is split into two different memory regions ("Mem0," "Mem1") which are alternately loaded with image data from image sensor 651. Thus, during a first image frame period or exposure interval (i.e., "Frame 1"), pixel count values accumulated within image sensor IC 651 are output via PHY 657 in a sequence of memory write operations directed to memory region 0, with each such write operation effected by transmission of control, address and data signals on chip-to-chip signaling path 652. As shown by the empty transfer slots between successive memory write operations during Frame 1, the write operations do not consume the entire bandwidth of signaling path 652 (or the memory component signaling interface), leaving bandwidth for reconstruction processor 655 to retrieve stored image data from memory component 653 even as further image data is being stored. Accordingly, during a subsequent image frame period ("Frame 2"), pixel count values accumulated within image sensor IC 651 (i.e., corresponding to another image capture within pixel array 659) are output in a sequence of memory write operations directed to memory region 1, while an interleaved sequence of memory read accesses is executed by reconstruction processor 655 to retrieve image data stored (during Frame 1) in memory region 0. In subsequent frame 3, the same interleaved sequence of memory writes and reads is executed, with the destination and source regions of memory being alternated so that image sensor IC 651 writes Frame 3 image data to memory region 0, while the reconstruction processor retrieves Frame 2 image data from memory region 1. This alternation between destination and source memory regions may continue indefinitely as additional image frames are captured. Also, while a single memory component 653 is divided into different logical storage sections (or physical storage sections as in two different internal memory banks or two different groups of internal memory banks) in the embodiment of FIG. 25, two or more memory components may also be provided, with memory regions 0 and 1 being implemented in separate memory components or separate groups of memory components. Further, while reconstruction processor 655 is depicted as a dedicated IC within architecture 650, the reconstruction processor may alternatively be disposed on the same IC die as image sensor 651 and/or memory 653. Where two or more dies are used to implement the architecture shown in FIG. 25, the dies may be packaged as a unit, as in a three-dimensional IC, multi-chip module, multi-chip package, package in package, package on package and so forth.

It should be noted that the various circuits disclosed herein can be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions can be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions can be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation with an image sensor, the method comprising:
    accumulating photocharge within a two-dimensional array of pixel groups disposed in a first integrated circuit die, each of the pixel groups including a two-dimensional array of pixels;
    outputting signals representative of the photocharge accumulated within the two-dimensional array of pixel groups to a two-dimensional array of sense-amp/counter circuits disposed in a second integrated circuit die, the second integrated circuit die being coupled in a stacked configuration with the first integrated circuit die to align and enable electrical coupling between each of the sense/amp counter circuits and a respective, counterpart pixel group within the two-dimensional array of pixel groups;
    generating, within each of the sense-amp/counter circuits and in accordance with the signals representative of photocharge accumulated, digital values representative of photocharge accumulated within respective pixels of the two-dimensional array of pixels included within the counterpart pixel group; and
    generating, within each of the sense-amp/counter circuits, a count value that constitutes a sum of the digital values representative of photocharge accumulated within the respective pixels of the two-dimensional array of pixels included within the counterpart pixel group.

2. The method of claim 1 wherein outputting signals representative of the photocharge accumulated within the two-dimensional array of pixel groups comprises outputting signals from each of the pixel groups to each of the sense-amp/counter circuits simultaneously.

3. The method of claim 2 wherein outputting signals from each of the pixel groups to each of the sense/amp counter circuits simultaneously comprises, for each one of the pixel groups, outputting a sequence of signals that correspond to photocharge accumulated within respective pixels of the two-dimensional array of pixels included within the one of the pixel groups.

4. The method of claim 3 wherein generating, within each of the sense-amp/counter circuits, digital values representative of photocharge accumulated within pixels of the two-dimensional array of pixels comprises generating a respective digital value for each signal of the sequence of signals.

5. The method of claim 1 wherein generating, within each of the sense-amp/counter circuits, digital values representative of photocharge accumulated within pixels of the two-dimensional array of pixels comprises generating a respective binary value representative of photocharge accumulated within each pixel of the two-dimensional array of pixels included within the counterpart pixel group.

6. The method of claim 5 wherein generating the respective binary value representative photocharge accumulated within each pixel comprises generating, for each pixel, a single-bit digital value having either a first logic state or a second logic state according to whether the photocharge accumulated within the pixel exceeds a predetermined threshold.

7. The method of 1 wherein accumulating photocharge within the two dimensional array of pixel groups, outputting signals representative of the photocharge accumulated and generating digital values representative of the photocharge accumulated constitutes a first exposure and read-out of the two-dimensional array of pixel groups, and wherein the method further comprises executing additional exposures and corresponding read-outs of the two-dimensional array of pixel groups in which each read-out is followed by cumulative increase in the count value within each of the sense-amp/counter circuits in accordance with the digital values representative of photocharge accumulated during the corresponding exposure.

8. The method of claim 7 further comprising resetting each pixel within each pixel group of the two-dimensional array of pixel groups following each read-out.

9. The method of claim 7 wherein the first exposure and the additional exposures transpire over a frame interval, the method further comprising outputting, at the conclusion of the frame interval and as a constituent pixel value within a digital image corresponding to the frame interval, the count value from each of the sense/amp counter circuits.

10. The method of claim 9 wherein the count value output from each of the sense/amp counter circuits at the conclusion of the frame interval has a respective value between 0 and N*M, where N is the number of pixels within each two-dimensional array of pixels, M is number of exposures that transpire within the frame interval, and '*' designates multiplication.

11. An image sensor comprising:
    a two-dimensional array of pixel groups disposed in a first integrated circuit die, each of the pixel groups including a two-dimensional array of pixels to accumulate photocharge;
    a two-dimensional array of sense-amp/counter circuits disposed in a second integrated circuit die that is coupled in a stacked configuration with the first integrated circuit die to align and effect electrical coupling between each of the sense/amp counter circuits and a respective, counterpart pixel group within the two-dimensional array of pixel groups; and
    control circuitry disposed within at least one of the first and second integrated circuit dies to output control signals that enable:
        the two-dimensional array of pixel groups to output signals representative of the photocharge accumulated within constituent pixels thereof to the two-dimensional array of sense-amp/counter circuits disposed in the second integrated circuit die;
        generation, within each of the sense-amp/counter circuits and in accordance with the signals representative of photocharge accumulated, of digital values representative of photocharge accumulated within respective pixels of the two-dimensional array of pixels included within the counterpart pixel group; and
        generation, within each of the sense-amp/counter circuits, of a count value that constitutes a sum of the digital values representative of photocharge accumulated within the respective pixels of the two-dimensional array of pixels included within the counterpart pixel group.

12. The image sensor of claim 11 wherein the control circuitry to output control signals that enable the two-dimensional array of pixels to output signals representative of the photocharge accumulated within the two-dimensional array of pixel groups comprises circuitry to enable the two-dimensional array of pixels to output signals from each of the pixel groups to each of the sense-amp/counter circuits simultaneously.

13. The image sensor of claim 12 wherein the control circuitry to output control signals that enable the two-dimensional array of pixels to output signals from each of the pixel groups to each of the sense/amp counter circuits simultaneously comprises circuitry to enable the two-dimensional array of pixels to output, for each one of the pixel groups, a sequence of signals that correspond to photocharge accumulated within respective pixels of the two-dimensional array of pixels included within the one of the pixel groups.

14. The image sensor of claim 13 wherein the control circuitry to output control signals that enable generation, within each of the sense-amp/counter circuits, of digital values representative of photocharge accumulated within pixels of the two-dimensional array of pixels comprises circuitry to enable generation, within each of the sense-amp/counter circuits, of a respective digital value for each signal of the sequence of signals.

15. The image sensor of claim 11 wherein the control circuitry to output control signals that enable generation, within each of the sense-amp/counter circuits, of digital values representative of photocharge accumulated within pixels of the two-dimensional array of pixels comprises circuitry to enable generation, within each of the sense-amp/counter circuits, of a respective binary value representative of photocharge accumulated within each pixel of the two-dimensional array of pixels included within the counterpart pixel group.

16. The image sensor of claim 15 wherein the circuitry to enable generation of the respective binary value representative photocharge accumulated within each pixel comprises circuitry to enable generation, for each pixel, of a single-bit digital value having either a first logic state or a second logic state according to whether the photocharge accumulated within the pixel exceeds a predetermined threshold.

17. The image sensor of 11 wherein the control circuitry operates iteratively to enable generation of the digital values representative of the photocharge accumulated within the two-dimensional array of pixel groups following each of a plurality of exposure intervals, and to enable cumulative increase in the count value within each of the sense-amp/counter circuits in accordance with the digital values representative of photocharge accumulated during the corresponding exposure interval.

18. The image sensor of claim 17 wherein the signals output by the control circuitry act to reset each pixel within each pixel group of the two-dimensional array of pixel groups following each exposure interval.

19. The image sensor of claim 17 wherein the plurality of exposure intervals transpire over a frame interval, and wherein the signals output by the control circuitry further enable the each of the sense-amp/counter circuits to output, at the conclusion of the frame interval and as a constituent pixel value within a digital image corresponding to the frame interval, the count value accumulated therein, and wherein the count value output from each of the sense/amp counter circuits at the conclusion of the frame interval has a respective value between 0 and N*M, where N is the number of pixels within each two-dimensional array of pixels, M is number of exposures that transpire within the frame interval, and '*' designates multiplication.

20. An image sensor comprising:
a two-dimensional array of pixel groups disposed in a first integrated circuit die, each of the pixel groups including a two-dimensional array of pixels to accumulate photocharge;
a two-dimensional array of sense-amp/counter circuits disposed in a second integrated circuit die that is coupled in a stacked configuration with the first integrated circuit die to align and effect electrical coupling between each of the sense/amp counter circuits and a respective, counterpart pixel group within the two-dimensional array of pixel groups; and
means for outputting control signals that enable:
the two-dimensional array of pixel groups to output signals representative of the photocharge accumulated within constituent pixels thereof to the two-dimensional array of sense-amp/counter circuits disposed in the second integrated circuit die;
generation, within each of the sense-amp/counter circuits and in accordance with the signals representative of photocharge accumulated, of digital values representative of photocharge accumulated within respective pixels of the two-dimensional array of pixels included within the counterpart pixel group; and
generation, within each of the sense-amp/counter circuits, of a count value that constitutes a sum of the digital values representative of photocharge accumulated within the respective pixels of the two-dimensional array of pixels included within the counterpart pixel group.

* * * * *